US009363463B2

(12) United States Patent
Taneichi et al.

(10) Patent No.: US 9,363,463 B2
(45) Date of Patent: Jun. 7, 2016

(54) IMAGE MANAGEMENT SYSTEM, IMAGE MANAGEMENT METHOD, AND COMPUTER PROGRAM PRODUCT

(71) Applicants: Satoshi Taneichi, Tokyo (JP); Takeshi Ito, Tokyo (JP); Masanori Watanabe, Tokyo (JP)

(72) Inventors: Satoshi Taneichi, Tokyo (JP); Takeshi Ito, Tokyo (JP); Masanori Watanabe, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 39 days.

(21) Appl. No.: 14/107,403

(22) Filed: Dec. 16, 2013

(65) Prior Publication Data

US 2014/0184821 A1 Jul. 3, 2014

(30) Foreign Application Priority Data

Dec. 28, 2012 (JP) ................................. 2012-288475

(51) Int. Cl.
*H04N 5/77* (2006.01)
*H04N 21/6587* (2011.01)
*H04N 21/414* (2011.01)
*H04N 21/4728* (2011.01)
*H04N 21/2743* (2011.01)
(Continued)

(52) U.S. Cl.
CPC ........... *H04N 5/772* (2013.01); *H04N 1/00217* (2013.01); *H04N 1/32101* (2013.01); *H04N 1/32776* (2013.01); *H04N 21/2743* (2013.01); *H04N 21/41407* (2013.01); *H04N 21/4223* (2013.01); *H04N 21/4728* (2013.01); *H04N 21/6587* (2013.01); *H04N 21/8153* (2013.01); *H04N 5/76* (2013.01); *H04N 5/765* (2013.01); *H04N 2201/325* (2013.01); *H04N 2201/3226* (2013.01); *H04N 2201/3276* (2013.01)

(58) Field of Classification Search
CPC .............. H04N 5/772; H04N 21/6587; H04N 21/41407; H04N 21/4728; H04N 21/2743; H04N 21/4223; H04N 21/8153; H04N 1/32101; H04N 1/32776; H04N 1/00217; H04N 2201/3226; H04N 2201/3276; H04N 2201/325
See application file for complete search history.

(56) References Cited

U.S. PATENT DOCUMENTS

| | | | |
|---|---|---|---|
| 7,714,936 B1 * | 5/2010 | Martin .............. | G06F 17/30017 348/207.99 |
| 7,990,394 B2 * | 8/2011 | Vincent ................... | G06T 17/05 345/419 |

(Continued)

FOREIGN PATENT DOCUMENTS

| | | | |
|---|---|---|---|
| JP | 2010-081589 | | 4/2010 |
| JP | 2011-120201 | | 6/2011 |
| WO | 2013034065 | * | 3/2013 |

*Primary Examiner* — Shahbaz Nazrul
(74) *Attorney, Agent, or Firm* — Oblon, McClelland, Maier & Neustadt, L.L.P.

(57) ABSTRACT

The present invention is concerning to an image management system that communicates with a first communication terminal via a communication network, the image management system comprising: an image storage unit configured to store image data; a receiving unit configured to receive, from the first communication terminal, link information that includes image identification information for identifying the image data and includes predetermined-area information that indicates a predetermined area in the image data; and a transmitting unit configured to transmit, to the first communication terminal, the image data that is indicated by the image identification information included in the link information received by the receiving unit and the predetermined-area information included in the link information.

9 Claims, 24 Drawing Sheets

CAPTURED IMAGE
(MERCATOR IMAGE)
(a)

SHARED SELECTION IMAGE
(b)

(51) Int. Cl.
*H04N 21/4223* (2011.01)
*H04N 21/83* (2011.01)
*H04N 1/327* (2006.01)
*H04N 5/765* (2006.01)
*H04N 5/76* (2006.01)
*H04N 1/00* (2006.01)
*H04N 1/32* (2006.01)
*H04N 21/81* (2011.01)

(56) References Cited

U.S. PATENT DOCUMENTS

| | | | |
|---|---|---|---|
| 2002/0114536 A1* | 8/2002 | Xiong et al. | 382/284 |
| 2004/0201677 A1* | 10/2004 | Bronson | G08B 13/19663 348/207.1 |
| 2005/0062869 A1* | 3/2005 | Zimmermann | G02B 13/06 348/335 |
| 2006/0187305 A1* | 8/2006 | Trivedi et al. | 348/169 |
| 2007/0002131 A1* | 1/2007 | Ritchey | H04N 5/232 348/39 |
| 2009/0007019 A1* | 1/2009 | Kobayashi et al. | 715/838 |
| 2010/0045773 A1* | 2/2010 | Ritchey | G02B 13/06 348/36 |
| 2010/0115462 A1* | 5/2010 | Spencer et al. | 715/800 |
| 2010/0177160 A1* | 7/2010 | Tocher et al. | 348/36 |
| 2011/0173565 A1* | 7/2011 | Ofek et al. | 715/790 |
| 2012/0144296 A1* | 6/2012 | Rao et al. | 715/273 |
| 2012/0249831 A1* | 10/2012 | Porter | 348/231.3 |
| 2013/0069990 A1* | 3/2013 | Geise et al. | 345/660 |
| 2014/0063061 A1* | 3/2014 | Reitan | G09G 3/003 345/633 |
| 2014/0063181 A1* | 3/2014 | Lee | G06T 3/0025 348/36 |
| 2014/0104280 A1* | 4/2014 | Ofstad et al. | 345/440 |
| 2014/0333719 A1* | 11/2014 | Williams | 348/36 |

* cited by examiner

FIG.4
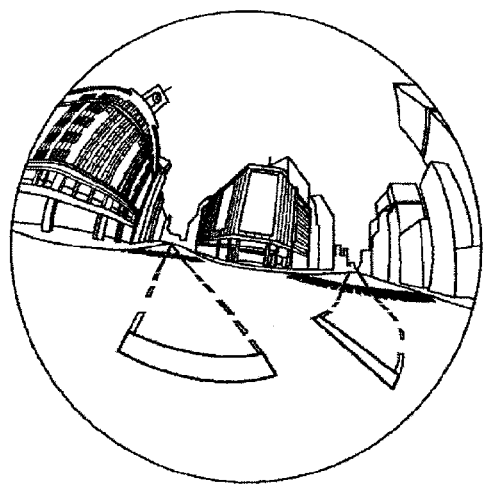
HEMISPHERIC IMAGE
(FRONT SIDE)
(a)
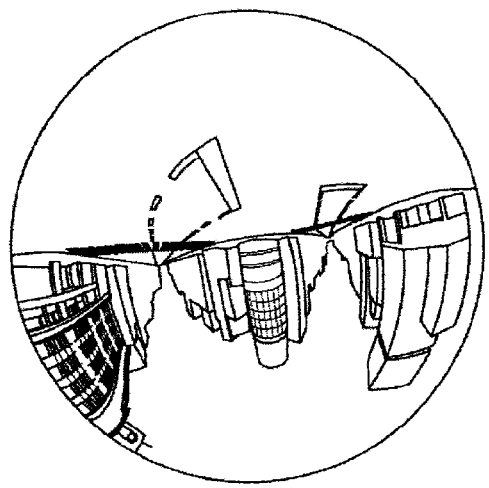
HEMISPHERIC IMAGE
(BACK SIDE)
(b)
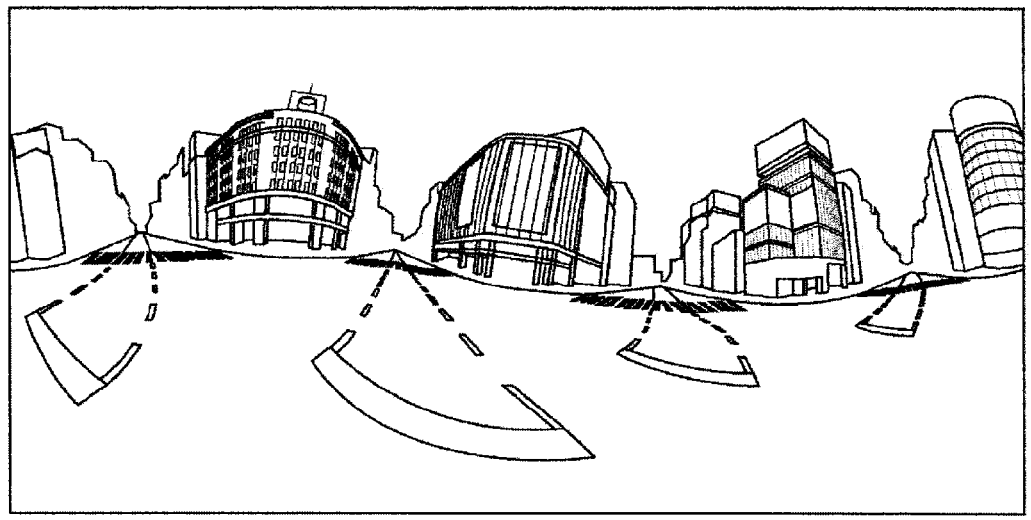
CAPTURED IMAGE
(MERCATOR IMAGE)
(c)

FIG.5
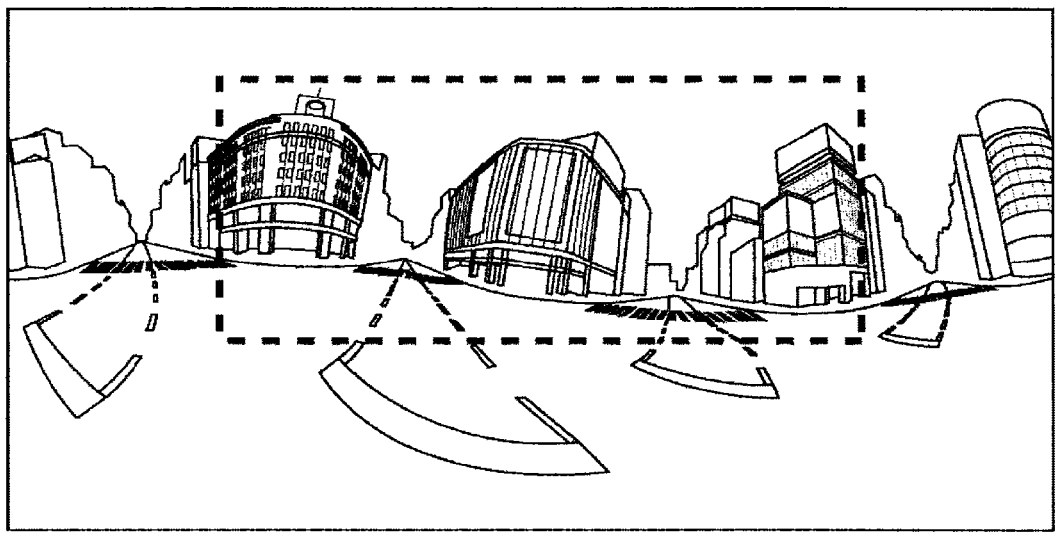
CAPTURED IMAGE
(MERCATOR IMAGE)
(a)
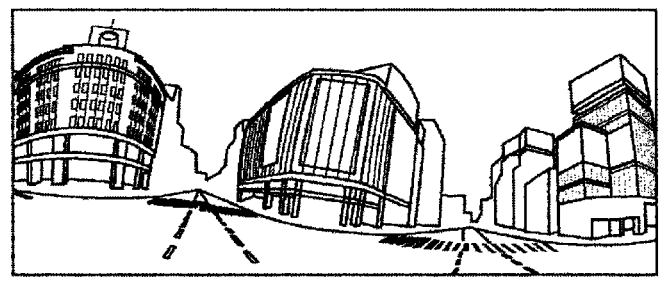
SHARED SELECTION IMAGE
(b)

FULLY-SPHERICAL
PANORAMIC IMAGE

FIG.19

IMAGE MANAGEMENT TABLE

| USER ID | IMAGE ID | FILE NAME OF IMAGE DATA |
|---|---|---|
| u100001 | au1415ifauy | au1415ifauy.jpg |
| u100002 | au1416ifauy | au1416ifauy.jpg |
| ⋮ | ⋮ | ⋮ |

FIG.20

THUMBNAIL MANAGEMENT TABLE

| THUMBNAIL ID | IMAGE ID | FILE NAME OF THUMBNAIL DATA |
|---|---|---|
| t0001 | au1415ifauy | au1415ifauy.thum.jpg |
| t0002 | au1416ifauy | au1416ifauy.thum.jpg |
| ⋮ | ⋮ | ⋮ |

FIG.21

USER MANAGEMENT TABLE

| USER ID | PASSWORD | USER IMAGE | USER PERSONAL INFORMATION |
|---|---|---|---|
| u100001 | up00001 | u100001.jpg | James, ⋯ |
| u100002 | up00002 | u100002.jpg | Kurt, ⋯ |
| ⋮ | ⋮ | ⋮ | ⋮ |

FIG.22

RELATED-PERSON MANAGEMENT TABLE

| USER ID OF REGISTRANT | USER ID OF RELATED PERSON |
|---|---|
| u100001 | u100002, u100003, ⋯ |
| u100002 | u100001, u100003, ⋯ |
| ⋮ | ⋮ |

FIG.23

POSTED-DATA MANAGEMENT TABLE

| USER ID | LINK INFORMATION | FILE NAME OF THUMBNAIL DATA | COMMENT |
|---|---|---|---|
| u100001 | http://example.com/au1415ifauy/rH230rV439angle35 | au1415ifauy.thum/jpg | IMAGE OF FIRST BUILDING |
| u100002 | http://example.com/au1416ifauy/rH50rV100angle30 | au1416ifauy.thum/jpg | IMAGE OF SECOND BUILDING |
| ... | ... | ... | ... |

IMAGE MANAGEMENT SYSTEM, IMAGE MANAGEMENT METHOD, AND COMPUTER PROGRAM PRODUCT

CROSS-REFERENCE TO RELATED APPLICATIONS

The present application claims priority to and incorporates by reference the entire contents of Japanese Patent Application No. 2012-288475 filed in Japan on Dec. 28, 2012.

BACKGROUND OF THE INVENTION

1. Field of the Invention

The present invention relates to a communication with a predetermined communication terminal via a communication network.

2. Description of the Related Art

Recently, systems have been provided to share the same image with multiple users, where the image data captured by a digital camera, or the like, is uploaded by a user into a server on the Internet and the image data is downloaded from the server by another user (see Japanese Patent Application Laid-open No. 2011-120201).

For example, if another user downloads the image data illustrated in FIG. 28, a display 315 of a communication terminal 3, such as a smartphone, first displays the image of a predetermined area in the image data by default, as illustrated in FIG. 29. When the user touches the display 315 with the user's finger to operate it, the image data for representing the whole can be displayed as illustrated in FIG. 28.

However, according to a default setting, the predetermined-area image illustrated in FIG. 29 is generally a local image around the center of the composition that is obtained when captured by a digital camera, or the like; therefore, a problem occurs in that a user who uploads the image may not always be able to initially show to another user the local image to which the user pays attention or which is a recommended sight.

SUMMARY OF THE INVENTION

It is an object of the present invention to at least partially solve the problems in the conventional technology.

According to the present invention, there is provided: an image management system that communicates with a first communication terminal via a communication network, the image management system comprising: an image storage unit configured to store image data; a receiving unit configured to receive, from the first communication terminal, link information that includes image identification information for identifying the image data and predetermined-area information that indicates a predetermined area in the image data; and a transmitting unit configured to transmit, to the first communication terminal, the image data that is indicated by the image identification information included in the link information received by the receiving unit and the predetermined-area information included in the link information.

The present invention also provides an image management method performed by an image management system that includes an image storage unit that stores image data and that communicates with a first communication terminal via a communication network, the image management method comprising: receiving, from the first communication terminal, link information that includes image identification information for identifying the image data and predetermined-area information that indicates a predetermined area in the image data; reading the image data from the image storage unit on the basis of the image identification information included in the link information received at the receiving; and transmitting, to the first communication terminal, the image data read at the reading and the predetermined-area information included in the link information received at the receiving.

The present invention also provides a computer program product comprising a non-transitory computer-readable medium that contains a computer program that, when executed by a computer, cause the computer to perform operations comprising: receiving, from the first communication terminal, link information that includes image identification information for identifying the image data and predetermined-area information that indicates a predetermined area in the image data; reading the image data from the image storage unit on the basis of the image identification information included in the link information received at the receiving; and transmitting, to the first communication terminal, the image data read at the reading and the predetermined-area information included in the link information received at the receiving.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4(a) is a diagram that illustrates the hemispheric image (the front) captured by the capturing device, FIG. 4(b) is a diagram that illustrates the hemispheric image (the back) captured by the capturing device, and FIG. 4(c) is a diagram that illustrates the image represented by using the Mercator projection;

FIG. 5(a) is a diagram that illustrates the image represented by using the Mercator projection and the area of a shared selection image, and FIG. 5(b) is a diagram that illustrates the shared selection image;

FIG. 19 is a conceptual diagram that illustrates an image management table;

FIG. 20 is a conceptual diagram that illustrates a thumbnail management table;

FIG. 21 is a conceptual diagram that illustrates a user management table;

FIG. 22 is a conceptual diagram that illustrates a related-person management table;

FIG. 23 is a conceptual diagram that illustrates a posted-data management table;

DETAILED DESCRIPTION OF THE PREFERRED EMBODIMENTS

Exemplary embodiments of the present invention are explained in detail below with reference to FIGS. 1 to 27.

Outline of the Embodiment

Figure 1:
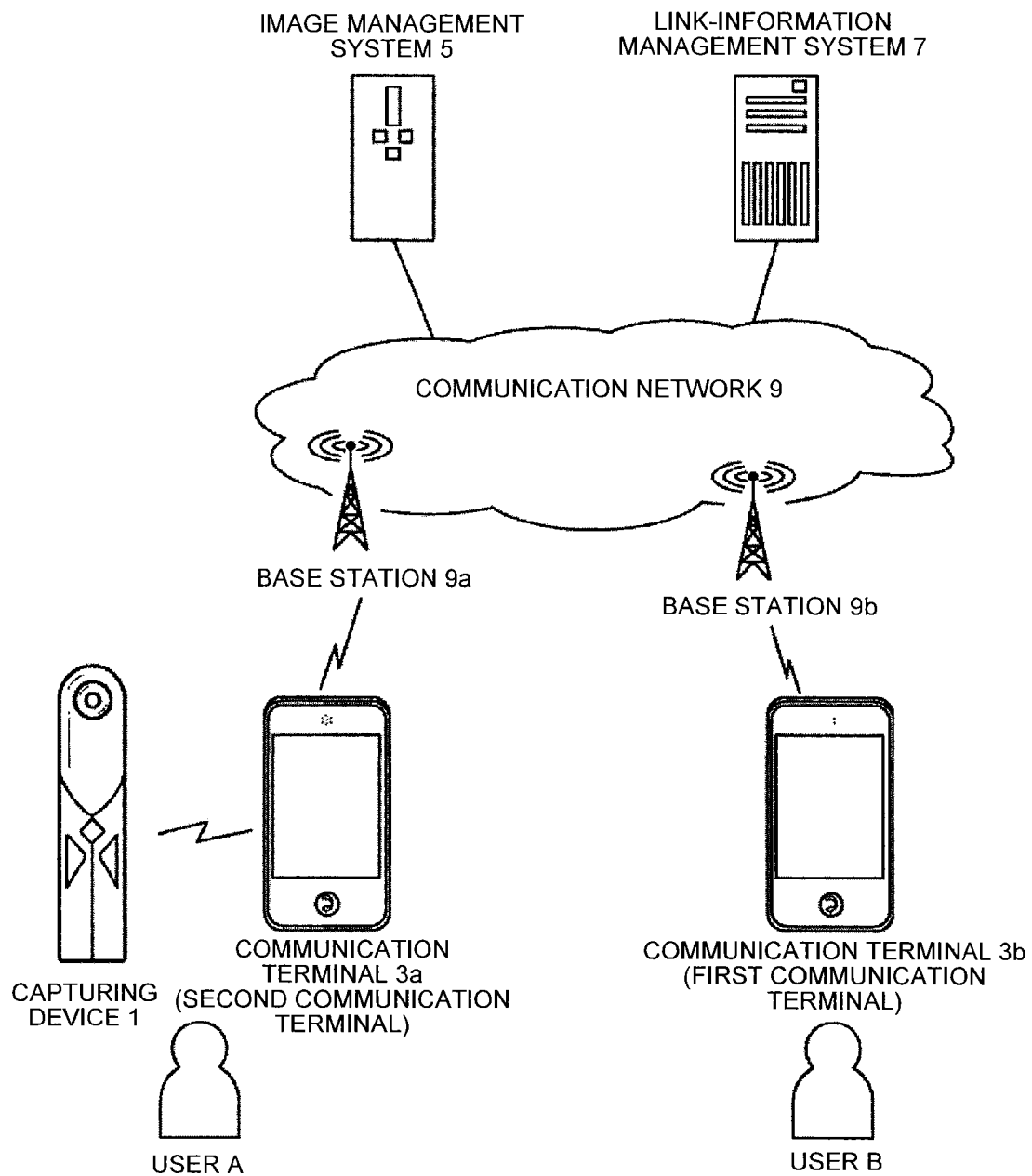
FIG. 1 is a schematic view of an image sharing system according to an embodiment of the present invention.
Figure 2:
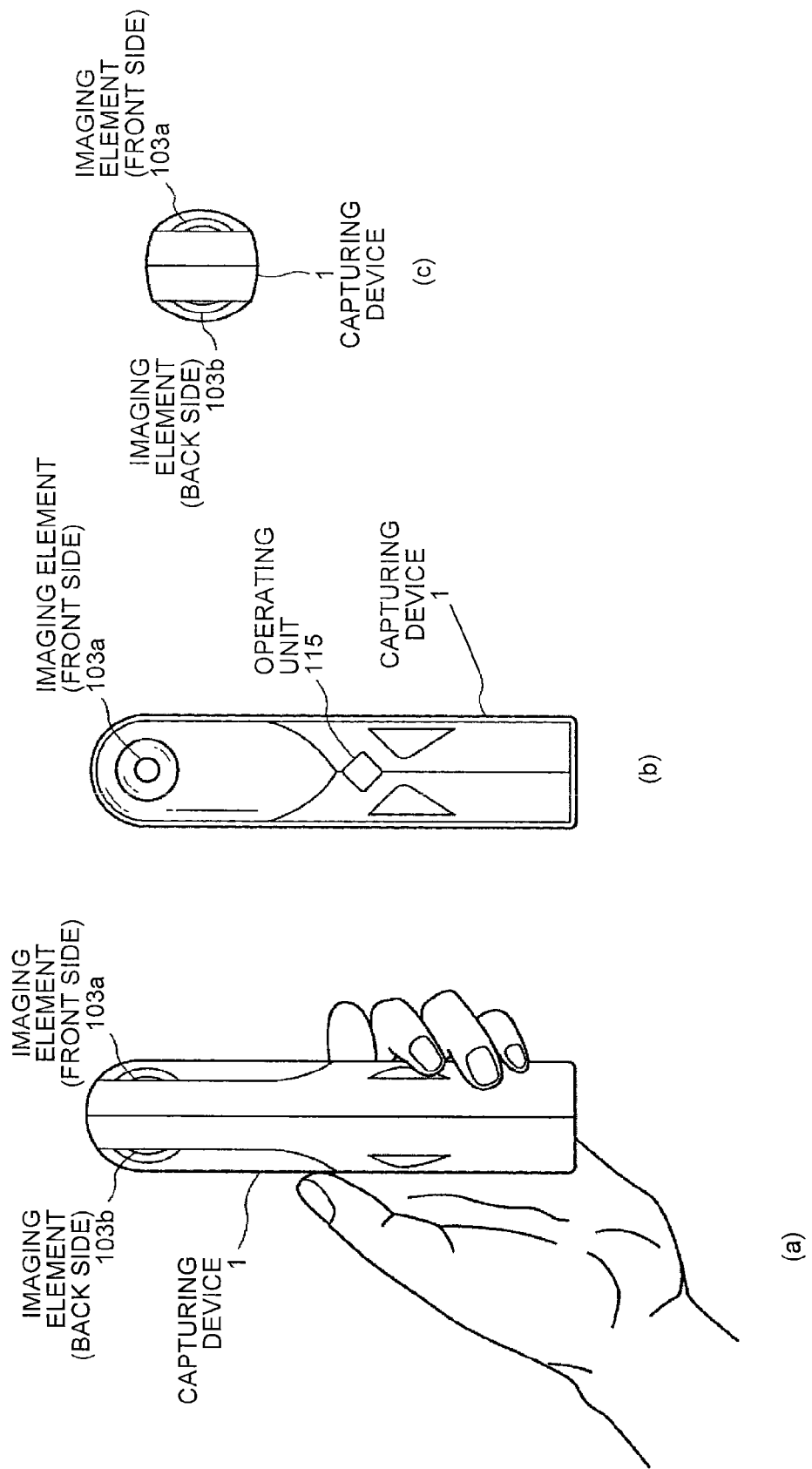
FIG. 2(a) is a left side view of a capturing device.
FIG. 2(b) is a front view of the capturing device.
FIG. 2(c) is a plan view of the capturing device.

First, an explanation is given, with reference to FIGS. 1 to 14, of the outline of the present embodiment. FIG. 1 is a schematic view of an image sharing system according to the present embodiment.

As illustrated in FIG. 1, the image sharing system according to the present embodiment is configured by using a capturing device 1, a plurality of communication terminals (3a, 3b), an image management system 5, and a link-information management system 7. Furthermore, the communication terminals (3a, 3b) are used by users (A, B), respectively. In an example illustrated in the present embodiment, the capturing device 1 is operated by the user A. In the following, any communication terminal out of the communication terminals (3a, 3b) is represented as the "communication terminal 3".

Furthermore, the capturing device 1 is a digital camera that captures fully-spherical panoramic images or omnidirectional images. The capturing device 1 may be a generally-used digital camera or, if a camera is installed on the communication terminal 3, the communication terminal 3 may be a digital camera. In the present embodiment, in order to facilitate explanations, an explanation is given by using a digital camera that captures fully-spherical panoramic images or omnidirectional images. The communication terminal 3 is a computer, such as a smartphone, tablet terminal, notebook PC, desktop PC, or Personal Data Assistance (PDA). Furthermore, the image management system 5 and the link-information management system 7 are the server computers.

The capturing device 1 is capable of communicating with the communication terminal 3 by using a short-range wireless technology in accordance with a Near Field Communication (NFC) standard, BlueTooth (registered trademark), Wireless Fidelity (WiFi), or the like. Furthermore, the communication terminal 3 is capable of communicating with the image management system 5 and the link-information management system 7 via a communication network 9. The communication network 9 is configured by using a radio communication network, such as 3rd Generation (3G), Worldwide Interoperability for Microwave Access (WiMAX), or Long Term Evolution (LTE), base stations (9a, 9b), and the Internet. A wire communication may be performed between the capturing device 1 and the communication terminal 3 and between the communication terminal 3 and the communication network 9.

A communication terminal 3a is an example of a second communication terminal, and a communication terminal 3b is an example of a first communication terminal.

Next, an explanation is given, with reference to FIGS. 2(a), 2(b), and 2(c), of the external of the capturing device 1. FIG. 2(a) is a left side view of the capturing device, FIG. 2(b) is a front view of the capturing device, and FIG. 2(c) is a plan view of the capturing device.

As illustrated in FIG. 2(a), the capturing device 1 has a size such that a person is able to hold it with one hand of the person. Furthermore, as illustrated in FIGS. 2(a), 2(b), and 2(c), an imaging element 103a is provided on the front side (the anterior side) of the upper section of the capturing device 1, and an imaging element 103b is provided on the back side (the rear side) thereof. Moreover, as illustrated in FIG. 2(b), an operating unit 115, such as a shutter button, is provided on the front side of the capturing device 1.

Figure 3:
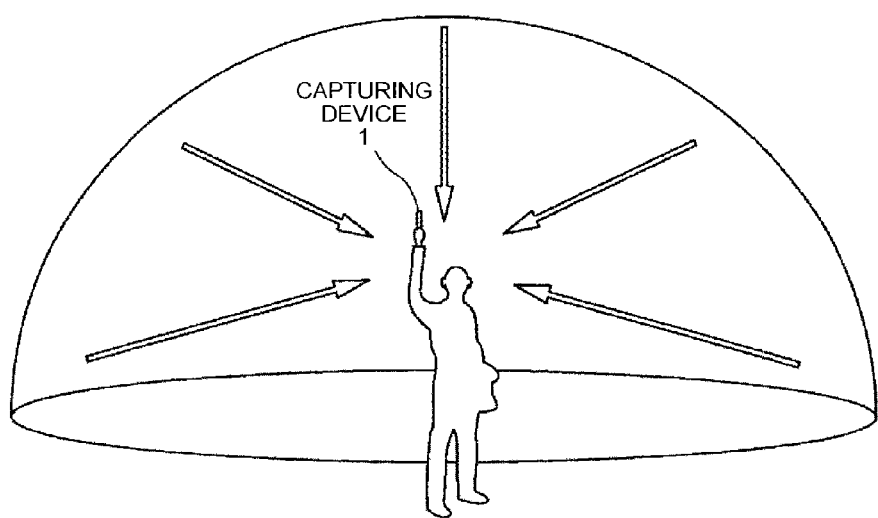
FIG. 3 is a diagram that illustrates an image illustrating how the capturing device is used.

Next, an explanation is given, with reference to FIG. 3, of the situation where the capturing device 1 is used. FIG. 3 is a diagram that illustrates an image illustrating how the capturing device is used. As illustrated in FIG. 3, the capturing device 1 is held by a user's hand and is used to capture objects around the user. In this case, objects around the user are captured by the imaging element 103a and the imaging element 103b that are illustrated in FIGS. 2(a), 2(b), and 2(c), whereby two hemispheric images can be obtained.

Next, an explanation is given, with reference to FIGS. 4(a), 4(b), and 4(c), of the images captured by the capturing device 1 and the combined image. FIG. 4(a) is a diagram that illustrates the hemispheric image (the front) captured by the capturing device, FIG. 4(b) is a diagram that illustrates the hemispheric image (the back) captured by the capturing device, and FIG. 4(c) is a diagram that illustrates the image represented by using the Mercator projection (hereafter, referred to as a "Mercator image").

As illustrated in FIG. 4(a), the image captured by the imaging element 103a is the hemispheric image (the front side) that is distorted due to a fish-eye lens 102a, which will be described later. Furthermore, as illustrated in FIG. 4(b), the image captured by the imaging element 103b is the hemispheric image (the back side) that is distorted due to a fish-eye lens 102b, which will be described later. The hemispheric image (the front side) and the hemispheric image (the back side) that is reversed 180 degrees are combined by the capturing device 1 so that the Mercator image is generated as illustrated in FIG. 4(c).

Figure 6:
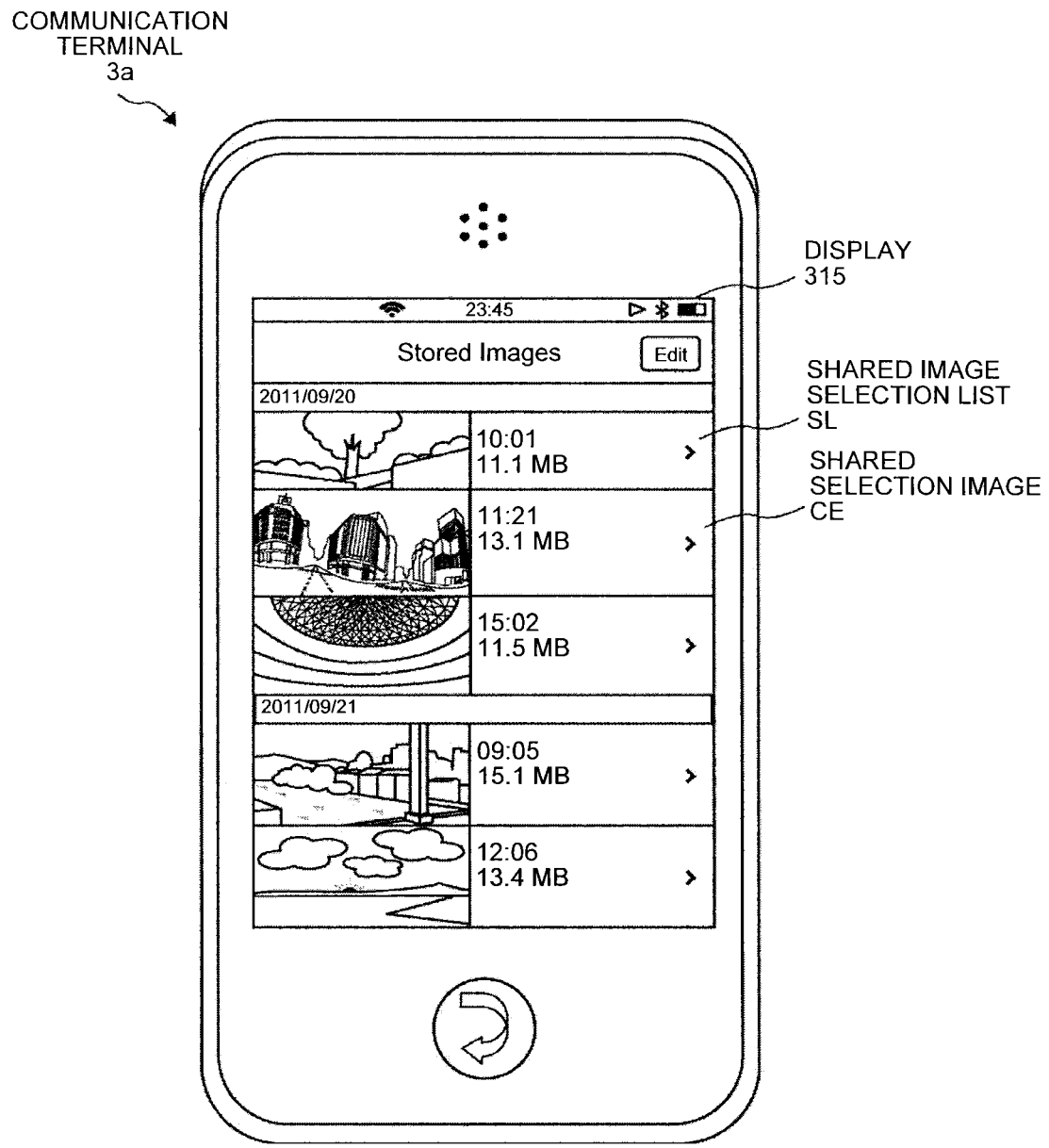
FIG. 6 is a diagram of a captured-image selection list that presents shared selection images.

Next, an explanation is given, with reference to FIGS. 5(a), 5(b), and 6, of shared selection image data that is transmitted from the capturing device 1 to the communication terminal 3. FIG. 5(*a*) is a diagram that illustrates the image represented by using the Mercator projection and the area of a shared selection image, and FIG. 5(*b*) is a diagram that illustrates the shared selection image. Furthermore, FIG. 6 is a diagram of a captured-image selection list that presents shared selection images.

As illustrated in FIG. 5(*a*), the area indicated by a dashed line in the Mercator image is used by the capturing device 1 so that the shared selection image data illustrated in FIG. 5(*b*) is generated. The shared selection image data is transmitted from the capturing device 1 to the communication terminal 3*a*. As illustrated in FIG. 6, a shared image selection list SL that presents each shared selection image CE is displayed on a display 315 of the communication terminal 3*a*. For example, buildings in a commercial area are displayed as the shared selection image CE, and the time and date (Sep. 20, 2011, 11:21) that the original image (the captured image illustrated in FIG. 5(*a*)) of the shared selection image CE is captured is displayed.

Figure 7:
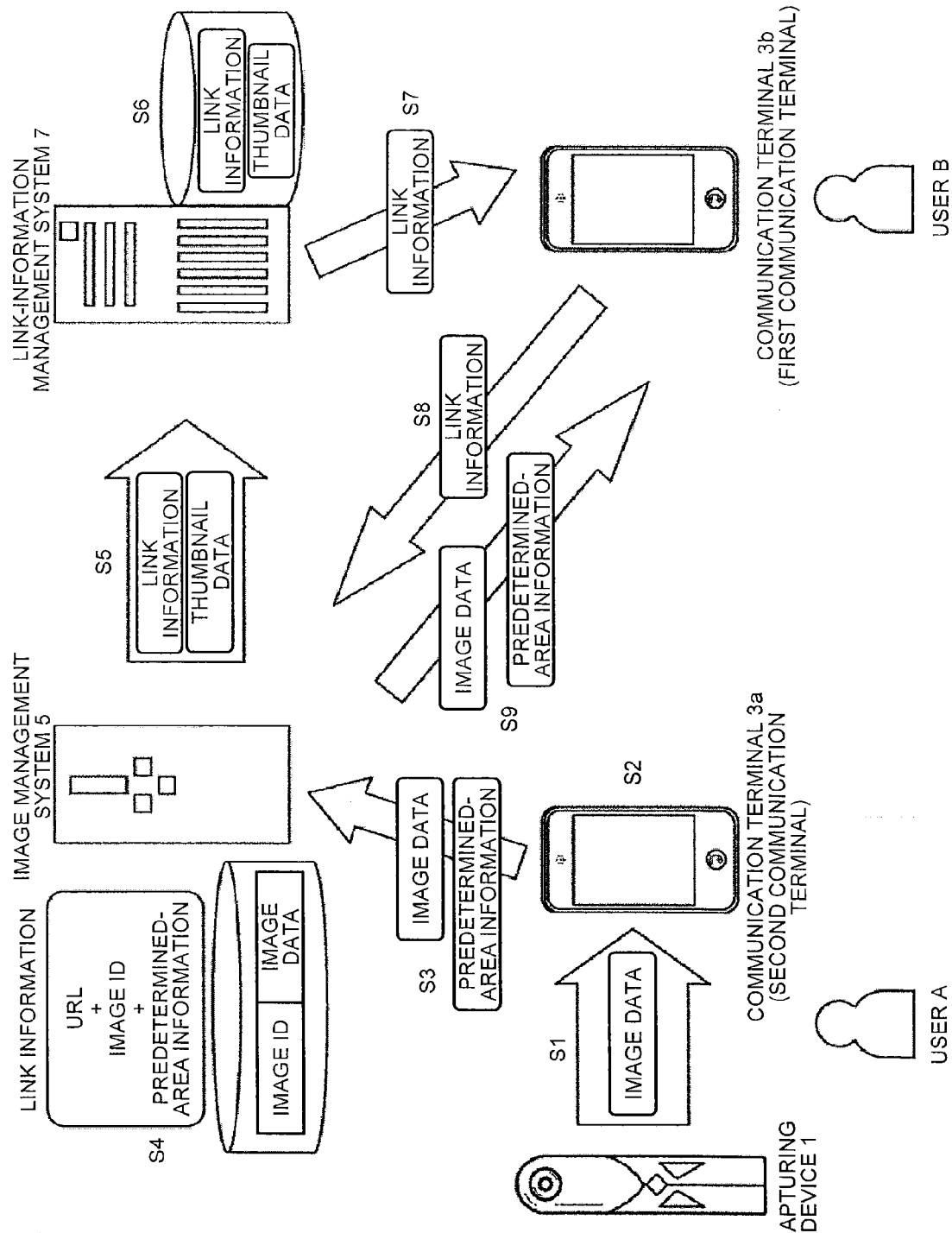
FIG. 7 is a diagram that schematically illustrates a process to post and acquire image data.

Next, an explanation is given, with reference to FIGS. 6 to 14, of the outline of a process to post and acquire image data according to the present embodiment. FIG. 6 is a diagram of a captured-image selection list that presents shared selection images. Furthermore, FIG. 7 is a diagram that illustrates a process to post and acquire image data.

Figure 8:
FIG. 8 is a diagram that illustrates a fully-spherical panoramic image.

First, when the user A selects the desired shared selection image CE illustrated in FIG. 6, the communication terminal 3*a* acquires, from the capturing device 1, the original image (the captured image) that is related to the above selected shared selection image CE (Step S1 in FIG. 7). Open Graphics Library for Embedded Systems (OpenGL ES) is used in the communication terminal 3*a* so that the fully-spherical panoramic image illustrated in FIG. 8 is generated from the captured image (the Mercator image) illustrated in FIG. 5(*a*) (Step S2 in FIG. 7). OpenGL ES is a graphics library that is used for visualizing two-dimensional (2D) and three-dimensional (3D) data. FIG. 8 is a diagram that illustrates the fully-spherical panoramic image. The fully-spherical panoramic image may be a still image or moving image. For example, the Mercator image illustrated in FIG. 5(*a*) is attached to a solid sphere so that the fully-spherical panoramic image illustrated in FIG. 8 is generated.

Figure 9:
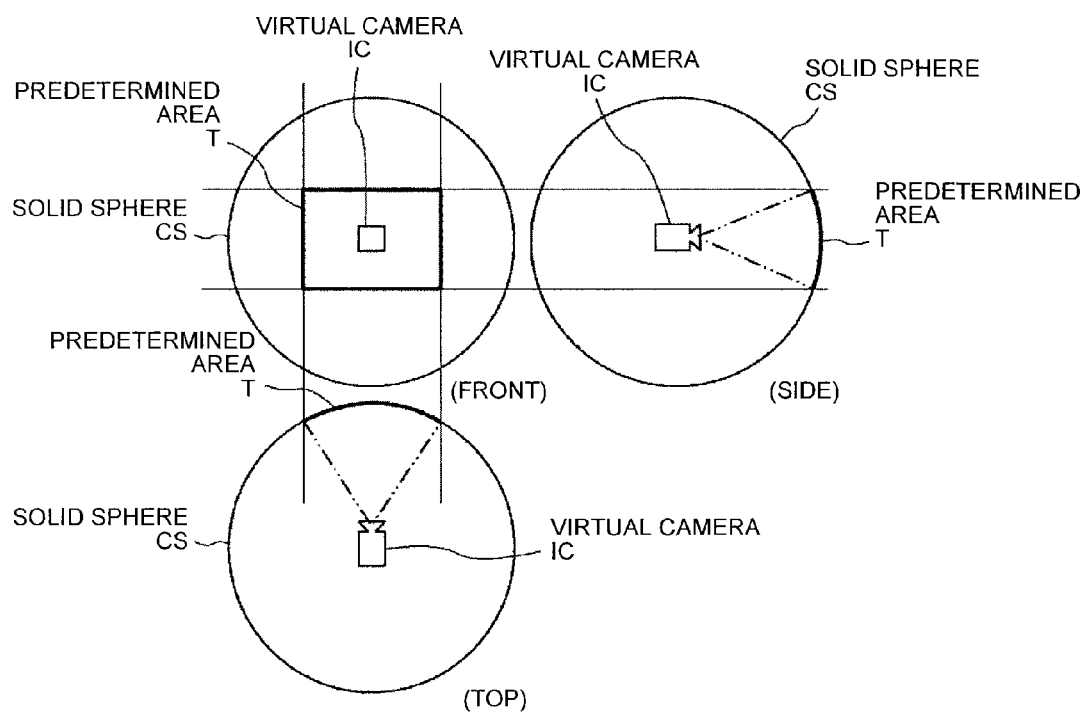
FIG. 9 is a diagram that illustrates a virtual camera and the location of a predetermined area in a case where the fully-spherical panoramic image is a three-dimensional solid sphere.
Figure 10:
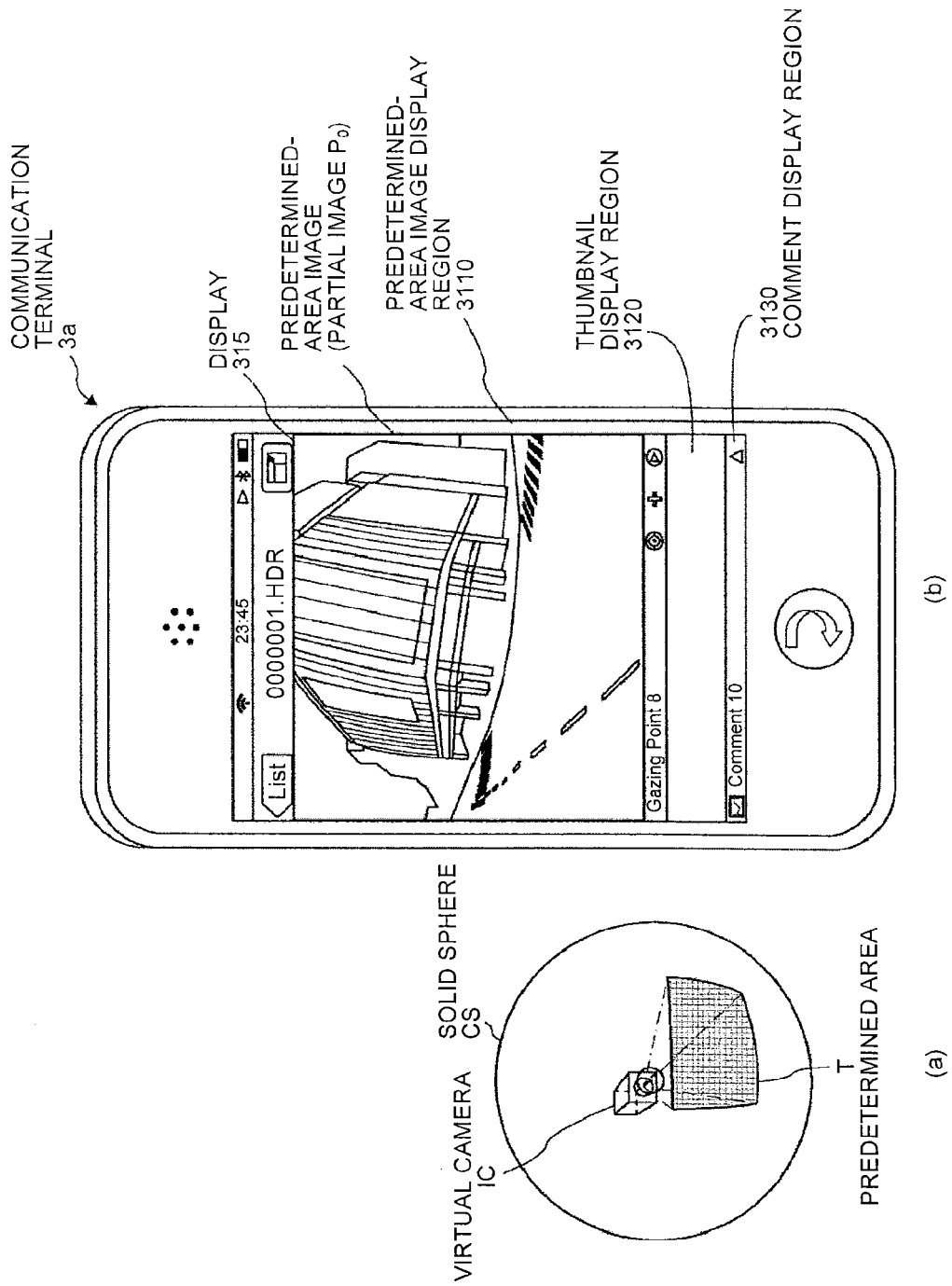
FIG. 10(a) is a three-dimensional perspective view of FIG. 9.
FIG. 10(b) is a diagram that illustrates a communication terminal where a predetermined-area image is presented on a display.

Next, an explanation is given, with reference to FIGS. 7, 9, 10(*a*), and 10(*b*), of a process to generate and display an image at a predetermined area (hereafter, referred to as a "predetermined-area image") of a fully-spherical panoramic image. FIG. 9 is a diagram that illustrates a virtual camera and the location of a predetermined area in a case where a fully-spherical panoramic image is a three-dimensional solid sphere. The virtual camera corresponds to the viewing location of the user who sees the fully-spherical panoramic image that is displayed as a three-dimensional solid sphere. Furthermore, FIG. 10(*a*) is a three-dimensional perspective view of FIG. 9, and FIG. 10(*b*) is a diagram that illustrates a communication terminal where a predetermined-area image is presented on the display.

The fully-spherical panoramic image illustrated in FIG. 8 is illustrated as a three-dimensional solid sphere CS. If the solid sphere CS of the fully-spherical panoramic image is generated as illustrated, a virtual camera IC is located at the center of the fully-spherical panoramic image and can rotate about three axes, i.e., rotate from side to side and up and down about the center and rotate (roll) with respect to the point of view from the center, as illustrated in FIG. 9. A predetermined area T of the fully-spherical panoramic image can be determined by using predetermined-area information on the location of the virtual camera IC on the fully-spherical panoramic image. The predetermined-area information is represented by using the x-coordinate (rH), the y-coordinate (rV), and the angle of view α (angle). Thus, the zoom for the predetermined area T can be achieved by enlarging or reducing the range of the angle of view α (the circular arc).

The image at the predetermined area T of the fully-spherical panoramic image illustrated in FIG. 10(*a*) is displayed as a predetermined-area image on the display 315 of the communication terminal 3*a* as illustrated in FIG. 10(*b*). In this case, the predetermined-area image is a partial image $P_0$ that represents part of the fully-spherical panoramic image. The partial image $P_0$ is the image that is presented by using the predetermined-area information (x, y, α)=(0, 0, 34) that is set by default with respect to the fully-spherical panoramic image illustrated in FIG. 8.

On the display 315 is displayed a predetermined-area image display region 3110 that displays a predetermined-area image, a thumbnail display region 3120 that displays the thumbnail of a predetermined-area image, and a comment display region 3130 that displays a user's comment.

Figure 11:
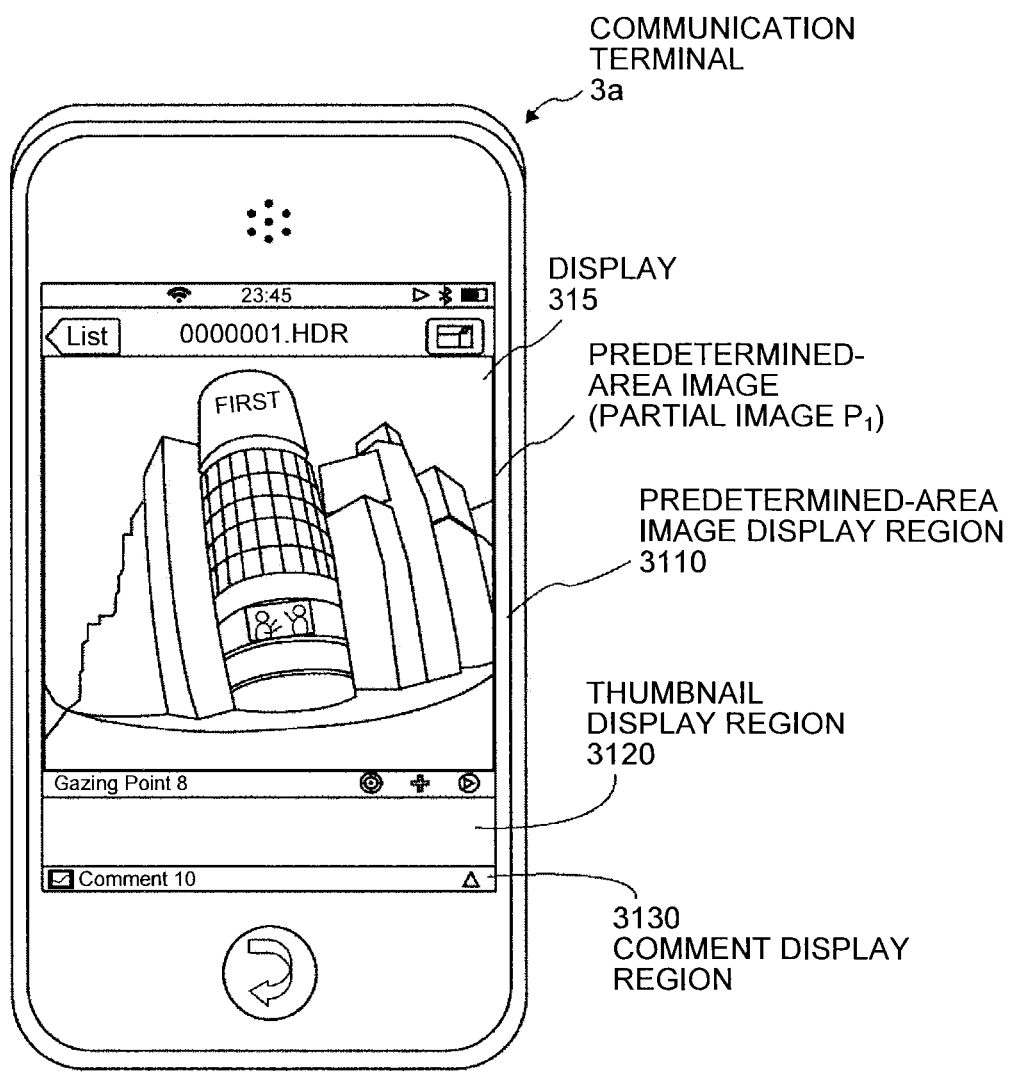
FIG. 11 is a diagram that illustrates the communication terminal where a predetermined-area image is presented on a display.

Next, if the user A desires to display, on the display 315, the predetermined-area image to which the user A pays attention, and if the communication terminal 3*a* enables an operation via a touch panel, the user A moves the user's finger in contact with the display 315 vertically and horizontally, whereby the desired predetermined-area image illustrated in FIG. 11 is displayed. Furthermore, if the communication terminal 3*a* is a personal computer, or the like, the user A performs an input operation by using a mouse, or the like, so as to move it vertically and horizontally, whereby the desired predetermined-area image illustrated in FIG. 11 can be displayed. In this case, the predetermined-area image is a partial image $P_1$ that illustrates part of the fully-spherical panoramic image.

Figure 12:
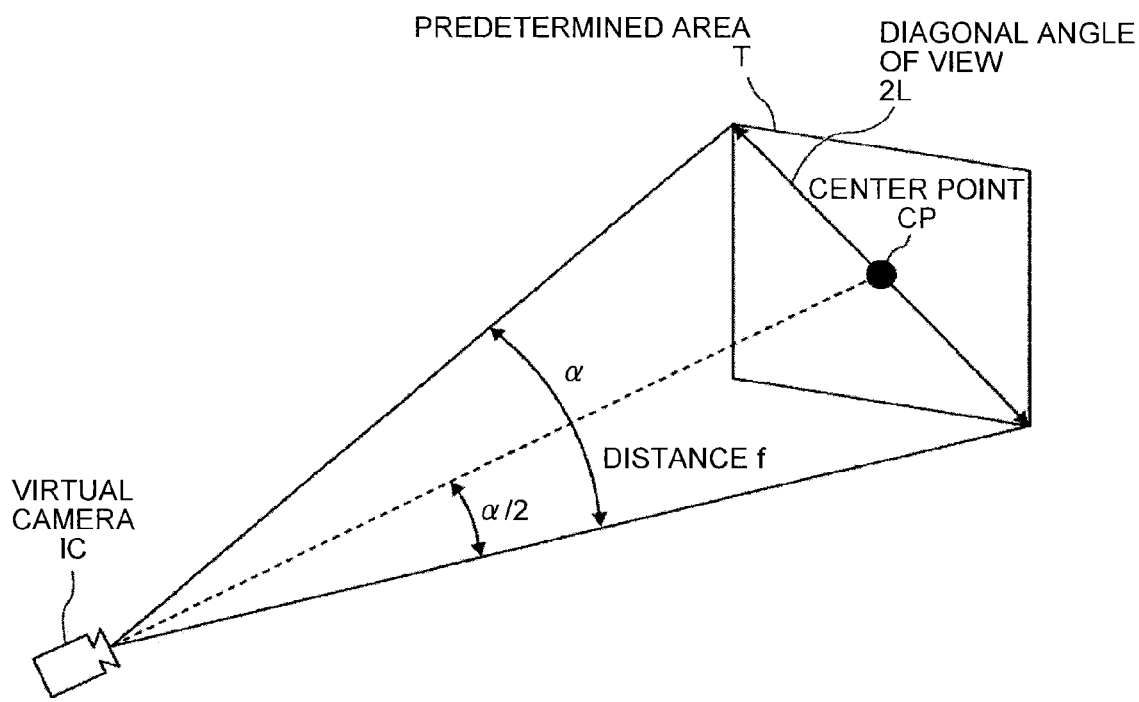
FIG. 12 is a diagram that illustrates the relation between predetermined-area information and a predetermined-area image.

Here, an explanation is given, with reference to FIG. 12, of the relation between predetermined-area information and a predetermined-area image. FIG. 12 is a diagram that illustrates the relation between predetermined-area information and a predetermined-area image.

As illustrated in FIG. 12, in the case of the diagonal angle of view 2L of the predetermined area T that is defined by the angle of view α of the virtual camera IC, a center point CP is the parameters (x, y) of the predetermined-area information. In the present embodiment, if the user A touches the display 315 with the user's finger to operate it so that the predetermined-area image (the partial image $P_1$) is displayed as illustrated in FIG. 11, the predetermined-area information (x, y, α) is, for example, (230, 439, 35).

Furthermore, f is the distance from the virtual camera IC to the center point CP. The trigonometric function generally defined by the following Equation (1) is provided in FIG. 12.

$$Lf=\tan(\alpha/2) \quad (1)$$

Next, as illustrated in FIG. 7, after the communication terminal 3*a* transmits the image data to the image management system 5 via the communication network 9, the communication terminal 3*a* also transmits the predetermined-area information (Step S3). The image data is the image data on the Mercator image illustrated in FIG. 4(*c*), and the predetermined-area information is the predetermined-area information (230, 439, 35) that indicates the predetermined-area image (the partial image $P_1$) illustrated in FIG. 11. Thus, the image management system 5 assigns, to the image data, the image ID (identification) for identifying the image data and also relates the image data to the image ID for management (Step S4). Furthermore, the image management system 5 generates link information (Step S4). As illustrated in FIG.

13, the link information includes the URL of the image management system 5, the image ID, and the predetermined-area information. Moreover, the image management system 5 generates thumbnail data of the image data (Step S4). The URL is an example of specific information.

The image management system 5 then transmits the link information and the thumbnail data to the link-information management system 7 (Step S5). Accordingly, the link-information management system 7 manages the link information and the thumbnail data (Step S6).

When the communication terminal 3*b* of the user B connects to the link-information management system 7 and requests display of corresponding image data, the link-information management system 7 transmits the link information to the communication terminal 3*b* of the user B (Step S7).

Figure 14:
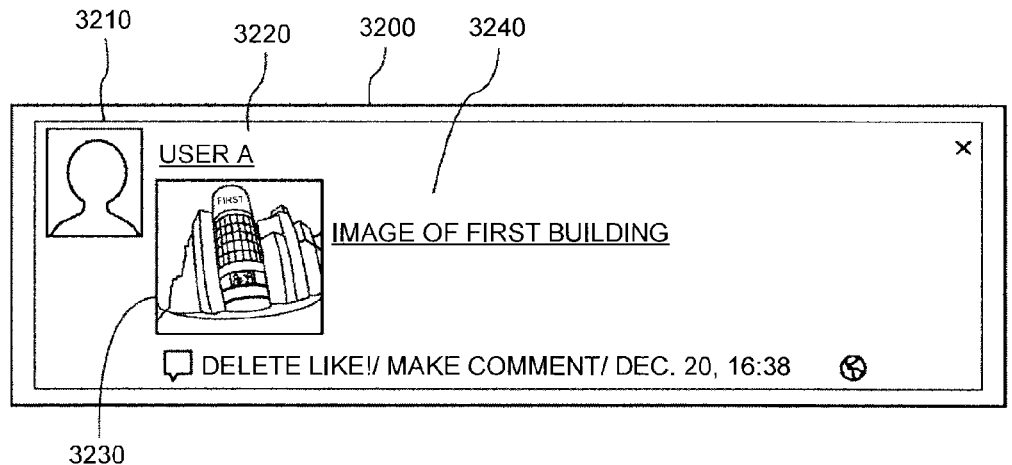
FIG. 14 is a diagram that illustrates a posting-view screen.

In this case, the communication terminal 3*b* displays a posting-view screen 3200 illustrated in FIG. 14. The posting-view screen 3200 displays a user image 3210 that represents the appearance of the user A, a user name 3220 of the user A, a thumbnail 3230 of the image data, and a comment 3240 from the user A. Specifically, the thumbnail 3230 is an image obtained by reducing the size of the predetermined-area image (the partial image $P_1$) illustrated in FIG. 11 and is not the image obtained by reducing the size of the predetermined-area image (the partial image $P_0$) illustrated in FIG. 10(*b*). Thus, the user B can view the thumbnail of the desired predetermined-area image (the partial image $P_1$) to which the user A pays attention or which is a recommended sight.

Next, the user B operates the communication terminal 3*b* so as to select a thumbnail, and then the communication terminal 3*b* transmits the link information to the image management system 5 (Step S8). Accordingly, the image management system 5 transmits, to the communication terminal 3*b*, the image data related to the image ID that is extracted from the link information and transmits the predetermined-area information that is extracted from the link information (Step S9). With respect to the image data, the communication terminal 3*b* then performs an operation to identify an area in the image data by using the predetermined-area information. Thus, the communication terminal 3*b* displays the predetermined-area image (the partial image $P_1$) illustrated in FIG. 11 instead of the predetermined-area image (the partial image $P_0$) illustrated in FIG. 10(*b*).

As described above, the communication terminal 3*b* downloads a captured image; however, this is not a limitation and the communication terminal 3*a* may download a captured image.

Hardware Configuration According to the Embodiment

Figure 15:
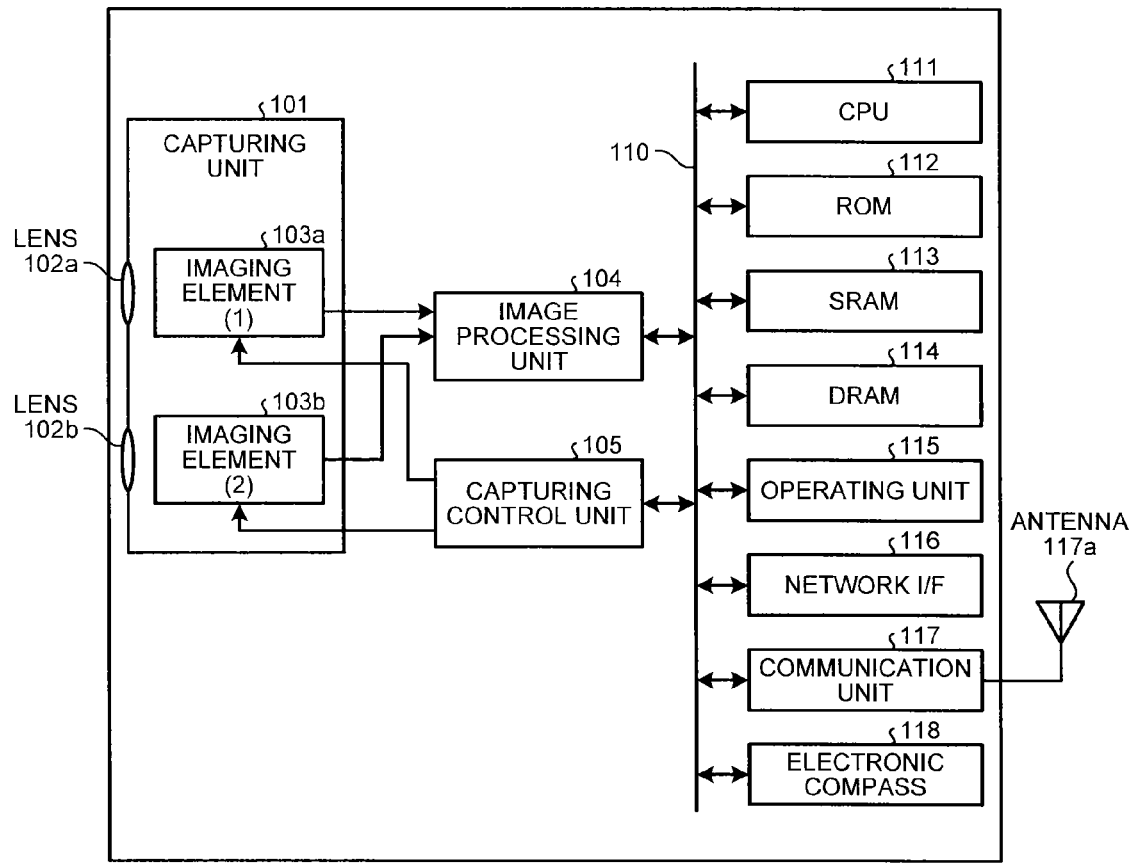
FIG. 15 is a hardware configuration diagram of the capturing device.
Figure 16:
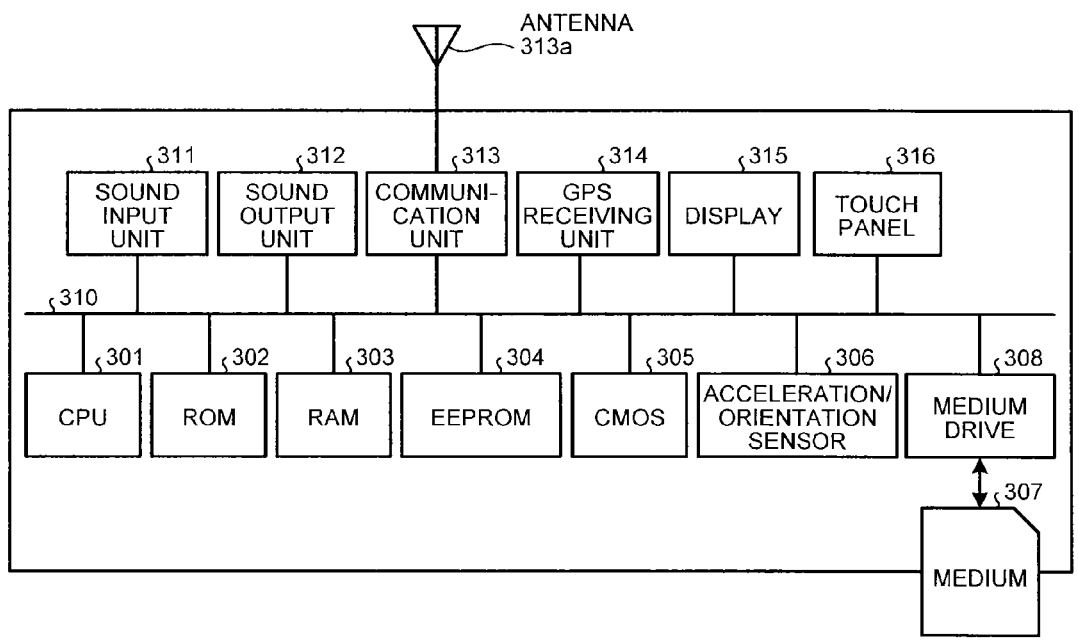
FIG. 16 is a hardware configuration diagram of the communication terminal.
Figure 17:
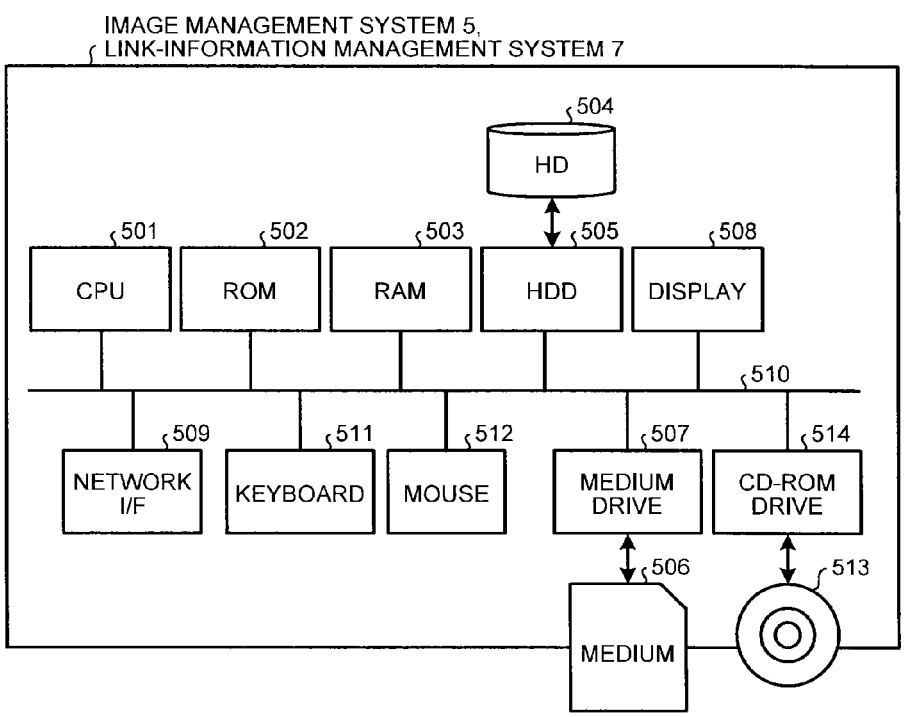
FIG. 17 is a hardware configuration diagram of an image management system or a link-information management system.

Next, a detailed explanation is given, with reference to FIGS. 15 to 17, of hardware configurations of the capturing device, the communication terminal, the image management system, and the link-information management system according to the present embodiment.

First, an explanation is given, with reference to FIG. 15, of a hardware configuration of the capturing device 1. FIG. 15 is a hardware configuration diagram of the capturing device. In the following, the capturing device 1 is an omnidirectional capturing device that uses two imaging elements; however, three or more imaging elements may be used. Furthermore, the device does not necessarily need to be dedicated to omnidirectional capturing; therefore, an omnidirectional capturing unit may be additionally attached to a commonly used digital camera, smartphone, or the like, so that the device has substantially the same functionality as the capturing device 1.

As illustrated in FIG. 15, the capturing device 1 includes a capturing unit 101, an image processing unit 104, a capturing control unit 105, a central processing unit (CPU) 111, a read only memory (ROM) 112, a static random access memory (SRAM) 113, a dynamic random access memory (DRAM) 114, an operating unit 115, a network I/F 116, a communication unit 117, an antenna 117*a*, and an electronic compass 118.

Furthermore, the capturing unit 101 includes wide-angle lenses (what are called fish-eye lenses) 102*a* and 102*b* that have an angle of view of equal to or greater than 180° so as to form a hemispheric image and includes the two imaging elements 103*a* and 103*b* that are provided in relation to the wide-angle lenses. The imaging elements 103*a* and 103*b* include an image sensor, such as a complementary metal oxide semiconductor (CMOS) sensor or charge coupled device (CCD) sensor, that converts an optical image formed by the fish-eye lens into image data using an electric signal for output; a timing generation circuit that generates horizontal or vertical synchronization signals for the image sensor, pixel clocks, or the like; a group of registers in which various commands, parameters, or the like, necessary for operations of the imaging element are set; and the like.

Each of the imaging elements 103*a* and 103*b* of the capturing unit 101 is connected to the image processing unit 104 via a parallel I/F bus. Furthermore, the imaging elements 103*a* and 103*b* of the capturing unit 101 are connected to the capturing control unit 105 via a serial I/F bus (an I2C bus, or the like). The image processing unit 104 and the capturing control unit 105 are connected to the CPU 111 via a bus 110. Furthermore, the ROM 112, the SRAM 113, the DRAM 114, the operating unit 115, the network I/F 116, the communication unit 117, an electronic compass 118, and the like, are connected to the bus 110.

The image processing unit 104 acquires the image data that is output from the imaging elements 103*a* and 103*b* via the parallel I/F bus, performs a predetermined operation on the image data, and performs an operation to combine the image data so as to generate data on the Mercator image illustrated in FIG. 4(*c*).

Generally, the capturing control unit 105 uses the capturing control unit 105 as a master device and the imaging elements 103*a* and 103*b* as slave devices and uses the I2C bus to set commands, or the like, in the group of registers in the imaging elements 103*a* and 103*b*. Necessary commands, and the like, are received from the CPU 111. Furthermore, the capturing control unit 105 also uses the I2C bus to acquire status data, and the like, from the group of registers in the imaging elements 103*a* and 103*b* and feeds it to the CPU 111.

Moreover, the capturing control unit 105 instructs the imaging elements 103*a* and 103*b* to output image data when the shutter button of the operating unit 115 is pressed. In some cases, the capturing device has a preview function or a function that supports a movie display by using a display. In this case, image data is continuously output from the imaging elements 103*a* and 103*b* at a predetermined frame rate (frame/minute).

Furthermore, as described below, the capturing control unit 105 also functions as a synchronization control unit that synchronizes the image data output timings of the imaging elements 103*a* and 103*b* in cooperation with the CPU 111. In the present embodiment, a display unit is not provided in the capturing device; however, a display unit may be provided.

The CPU 111 controls the overall operation of the capturing device 1 and performs necessary operations. The ROM 112 stores various programs for the CPU 111. The SRAM 113 and the DRAM 114 are working memories that store a program executed by the CPU 111, data that is being processed, and the like. Especially, the DRAM 114 stores the image data that is being processed by the image processing unit 104 or the data on the processed Mercator image.

The operating unit 115 is a generic term for various operation buttons, the power switch, the shutter button, the touch panel that has both display and operation functions, and the like. Users operate an operation button so as to input various capturing modes, capturing conditions, and the like.

The network I/F 116 is a generic term for interface circuits (a USB I/F, and the like) for external media, such as an SD card, a personal computer, or the like. Furthermore, in some cases, it is possible that the network I/F 116 is a network interface regardless of whether it is wireless or wired. Data on a Mercator image stored in the DRAM 114 is recorded in an external medium via the network I/F 116 or, if needed, is transmitted to an external device, such as the communication terminal 3, via the network I/F 116 that is a network I/F.

The communication unit 117 communicates with an external device, such as the communication terminal 3, via the antenna 117a installed in the capturing device 1 by using a short-range wireless technology, such as Wireless Fidelity (WiFi) or NFC. The communication unit 117 is also capable of transmitting Mercator image data to an external device, such as the communication terminal 3.

The electronic compass 118 calculates the orientation and the tilt (the roll angle) of the capturing device 1 by using the earth magnetism and outputs the orientation/tilt information. The orientation/tilt information is an example of metadata in accordance with Exif and is used for image processing, such as image correction, on a captured image. The metadata includes various types of data, such as a thumbnail of image data, the capturing time and date of an image, or the data volume of image data.

Next, an explanation is given, with reference to FIG. 16, of a hardware configuration of the communication terminal 3. FIG. 16 is a hardware configuration diagram in a case where the communication terminal is a smartphone.

As illustrated in FIG. 16, the communication terminal 3 includes a CPU 301 that controls the overall operation of the communication terminal 3; a ROM 302 that stores basic input/output programs; a random access memory (RAM) 303 that is used as a work area for the CPU 301; an electrically erasable and programmable ROM (EEPROM) 304 that performs reading or writing of data under the control of the CPU 301; a CMOS sensor 305 that is an imaging element that captures an object and acquires the image data under the control of the CPU 301; an electromagnetic compass or gyrocompass that detects the earth magnetism; various acceleration/orientation sensors 306, such as an acceleration sensor; and a medium drive 308 that controls reading or writing (storing) of data from or to a recording medium 307, such as a flash memory. The recording medium 307 is configured to be installed or removed, and the already recorded data is read from or new data is written and stored in the recording medium 307 under the control of the medium drive 308.

The EEPROM 304 stores the operating system (OS) executed by the CPU 301, other programs, and various types of data. Furthermore, a CCD sensor may be used instead of the CMOS sensor 305.

The communication terminal 3 further includes a sound input unit 311 that converts sound into a sound signal; a sound output unit 312 that converts a sound signal into sound; an antenna 313a; a communication unit 313 that communicates with the nearest base station 9a, or the like, on the basis of a wireless communication signal by using the antenna 313a; a Global Positioning System (GPS) receiving unit 314 that receives a GPS signal including the positional information (the latitude, longitude, and altitude) on the communication terminal 3 by using a GPS satellite or Indoor MEssaging System that is an indoor GPS; the display 315 that is a liquid crystal display, organic EL display, or the like, that displays the image of an object, various icons, and the like; a touch panel 316 that is mounted on the display 315 and is made up of a pressure-sensitive or static panel so as to detect the touch location on the display 315 that is touched by a finger, stylus, or the like; and a bus line 310, such as an address bus or data bus, that electrically connects the above-described units.

The sound input unit 311 includes a microphone that inputs sound, and the sound output unit 312 includes a speaker that outputs sound.

Next, an explanation is given, with reference to FIG. 17, of a hardware configuration of the image management system 5 and the link-information management system 7. FIG. 17 is a hardware configuration diagram of the image management system 5 or the link-information management system 7. The image management system 5 and the link-information management system 7 are generally-used server computers; therefore, the configuration of the image management system 5 is explained below, and an explanation of the configuration of the link-information management system 7 is omitted.

The image management system 5 includes a CPU 501 that controls the overall operation of the image management system 5; a ROM 502 that stores programs, such as IPL, that are used for driving the CPU 501; a RAM 503 that is used as a work area for the CPU 501; an HD 504 that stores various types of data, such as programs for the image management system 5; a hard disk drive (HDD) 505 that controls reading or writing of various types of data from or to the HD 504 under the control of the CPU 501; a medium drive 507 that controls reading or writing (storing) of data from or to a recording medium 506, such as a flash memory; a display 508 that displays various types of information, such as a cursor, menus, windows, characters, or images; a network I/F 509 that is used for data communication via the communication network 9; a keyboard 511 that includes a plurality of keys to input characters, numbers, various instructions, or the like; a mouse 512 that selects or executes various instructions, select an object to be processed, moves the cursor, or the like; a CD-ROM (compact disc read only memory) drive 514 that controls reading or writing of various types of data from or to a CD-ROM 513 that is an example of a removable recording medium; and a bus line 510, such as an address bus or data bus, that electrically connects the above-described components as illustrated in FIG. 17.

Functional Configuration According to the Embodiment

Figure 18:
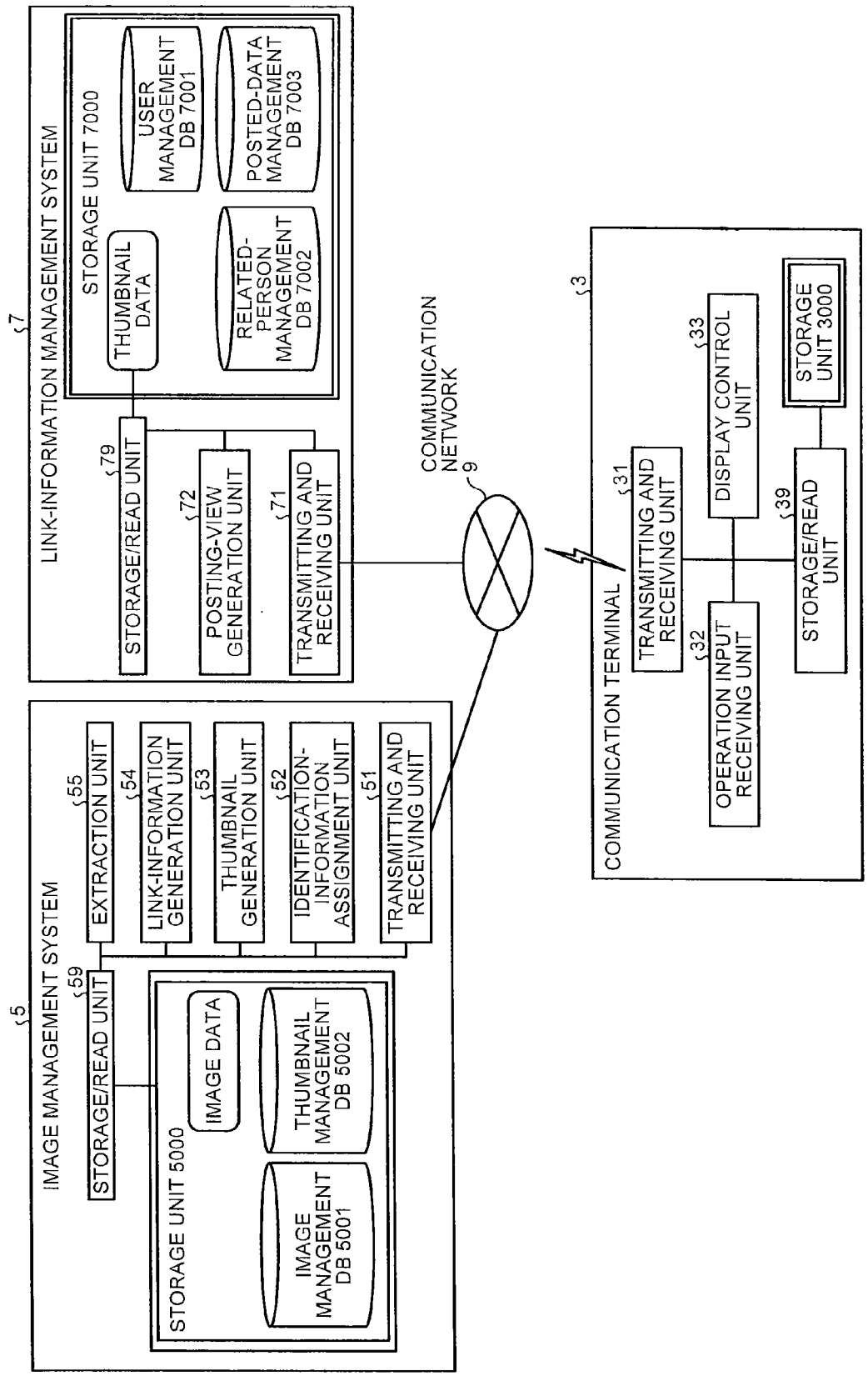
FIG. 18 is a functional block diagram of the communication terminal, the image management system, and the link-information management system according to the embodiment.

Next, an explanation is given, with reference to FIG. 18, of a functional configuration according to the present embodiment. FIG. 18 is a functional block diagram of the communication terminal 3, the image management system 5, and the link-information management system 7 that are included in the image sharing system according to the present embodiment. In FIG. 18, the communication terminal 3, the image management system 5, and the link-information management system 7 can perform data communication via the communication network 9.

Functional Configuration of the Communication Terminal

As illustrated in FIG. 18, the communication terminal 3 includes a transmitting and receiving unit 31, an operation input receiving unit 32, a display control unit 33, and a storage/read unit 39. Each of the units is a function or means that is implemented when any of the components illustrated in FIG. 15 is operated in accordance with a command received from the CPU 111 that follows the program for the communication terminal 3 that is loaded from the SRAM 113 into the DRAM 114.

Furthermore, the communication terminal 3 includes a storage unit 3000 that is configured by using the ROM 112, the SRAM 113, and the DRAM 114 that are illustrated in FIG. 15.

Each Functional Configuration of the Communication Terminal

Next, a detailed explanation is further given, with reference to FIGS. 16 and 18, of each functional configuration of the communication terminal 3.

The transmitting and receiving unit 31 of the communication terminal 3 is principally implemented due to operations of the communication unit 313 and the CPU 301 that are illustrated in FIG. 16 so as to transmit and receive various types of data (or information) to and from the image management system 5 or the link-information management system 7 via the communication network 9.

The operation input receiving unit 32 is principally implemented due to operations of the touch panel 316 and the CPU 301 so as to receive various selections or inputs from users.

The display control unit 33 is principally implemented due to an operation of the CPU 301 so as to perform control to display various images, characters, or the like, on the display 315.

The storage/read unit 39 stores various types of data (or information) in the storage unit 3000 or reads various types of data (or information) from the storage unit 3000.

Functional Configuration of Image Management System

Next, a detailed explanation is given, with reference to FIGS. 17 and 18, of each functional configuration of the image management system 5. The image management system 5 includes a transmitting and receiving unit 51, an identification-information assignment unit 52, a thumbnail generation unit 53, a link-information generation unit 54, an extraction unit 55, and a storage/read unit 59. Each of the units is a function or means that is implemented when any of the components illustrated in FIG. 17 is operated in accordance with a command received from the CPU 501 that follows the program for the image management system 5 that is loaded from the HD 504 into the RAM 503.

Furthermore, the image management system 5 includes a storage unit 5000 that is configured by using the RAM 503 and the HD 504 that are illustrated in FIG. 17. An image management DB 5001 is established in the storage unit 5000 and is configured by using an image management table, which will be described later. Furthermore, a thumbnail management DB 5002 is established in the storage unit 5000 and is configured by using a thumbnail management table, which will be described later.

Image Management Table

FIG. 19 is a conceptual diagram that illustrates an image management table. In the image management table, user ID for identifying a user, image ID for identifying image data, and the file name of the image data are stored in relation to one another for management. The user ID is an example of user identification information for uniquely identifying a user. The user identification information includes a service usage number, employee number, student ID number, citizen number based on a national identity numbering system, or the like. The image ID is an example of image identification information.

Thumbnail Management Table

FIG. 20 is a conceptual diagram that illustrates a thumbnail management table. In the thumbnail management table, thumbnail ID for identifying a thumbnail, image ID, and the file name of thumbnail data are stored in relation to one another for management. The thumbnail ID is an example of thumbnail identification information.

Each Functional Configuration of Image Management System

Next, a detailed explanation is given, with reference to FIGS. 17 and 18, of each functional configuration of the image management system 5.

The transmitting and receiving unit 51 of the image management system 5 is principally implemented due to operations of the network I/F 509 and the CPU 501 that are illustrated in FIG. 17 so as to transmit and receive various types of data (or information) to and from the communication terminal 3 or the link-information management system 7 via the communication network 9.

The identification-information assignment unit 52 is principally implemented due to an operation of the CPU 501 that is illustrated in FIG. 17 so as to assign image ID to, for example, the image data on the Mercator image received by the transmitting and receiving unit 51 and attach the image ID to the header section of the image data, thereby managing the image data. Furthermore, the identification-information assignment unit 52 assigns thumbnail ID to the thumbnail data generated by the thumbnail generation unit 53 and attaches the thumbnail ID to the header section of the thumbnail data.

The thumbnail generation unit 53 is principally implemented due to an operation of the CPU 501 that is illustrated in FIG. 17 so as to generate thumbnail data from the predetermined area T of the image data as illustrated in FIGS. 9 to 12 by using the image data that is indicated by the image ID received by the transmitting and receiving unit 51 and by using the predetermined area T that is indicated by the predetermined-area information received by the transmitting and receiving unit 51.

Figure 13:
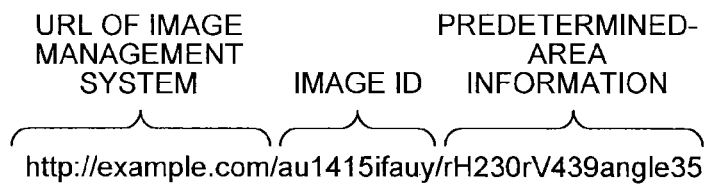
FIG. 13 is a diagram that illustrates the details of link information.

The link-information generation unit 54 is principally implemented due to an operation of the CPU 501 that is illustrated in FIG. 17 so as to link the URL of the image data indicated by the image ID received by the transmitting and receiving unit 51, the image ID assigned by the identification-information assignment unit 52, and the predetermined-area information received by the transmitting and receiving unit 51, thereby generating the link information illustrated in FIG. 13.

The extraction unit 55 is principally implemented due to an operation of the CPU 501 that is illustrated in FIG. 17 so as to extract the image ID and the predetermined-area information from the link information received by the transmitting and receiving unit 51.

The storage/read unit 59 stores various types of data (or information) in the storage unit 5000 or reads various types of data (or information) from the storage unit 5000.

Functional Configuration of Image Management System

Next, a detailed explanation is given, with reference to FIGS. 17 and 18, of a functional configuration of the link-information management system 7. The link-information management system 7 includes a transmitting and receiving unit 71, a posting-view generation unit 72, and a storage/read unit 79. Each of the units is a function or means that is implemented when any of the components illustrated in FIG. 17 is operated in accordance with a command received from the CPU 501 that follows the program for the link-information management system 7 that is loaded from the HD 504 into the RAM 503.

Furthermore, the link-information management system 7 includes a storage unit 7000 that is configured by using the RAM 503 and the HD 504 that are illustrated in FIG. 17. A user management DB 7001, a related-person management DB 7002, and a posted-data management DB 7003 are established in the storage unit 7000. The user management DB 7001 is made up of a user management table, which will be described later. The related-person management DB 7002 is made up of a related-person management table. The posted-data management DB 7003 is made up of a posted-data management table.

User Management Table

FIG. 21 is a conceptual diagram that illustrates the user management table. In the user management table, user ID, password used for user authentication, user image indicating the image of a user, and user personal information indicating the name of a user, or the like, are related for management.

Related-person Management Table

FIG. 22 is a conceptual diagram that illustrates the related-person management table. In the related-person management table, the user ID of each registrant (user) is related to the user ID of a person (user) related to the registrant for management. An example of the related person includes the registrant's friend, family, employee of the same company, or the like.

Posted-data Management Table

FIG. 23 is a conceptual diagram that illustrates the posted-data management table. In the posted-data management table, each user ID is related, for management, to the link information, the file name of thumbnail data, and the comment posted by the user.

Each Functional Configuration of Image Management System

Next, a detailed explanation is given, with reference to FIG. 18, of each functional configuration of the link-information management system 7.

The transmitting and receiving unit 71 of the link-information management system 7 is principally implemented due to operations of the network I/F 509 and the CPU 501 that are illustrated in FIG. 17 so as to transmit and receive various types of data (or information) to and from the communication terminal 3 or the image management system 5 via the communication network 9.

The posting-view generation unit 72 is principally implemented due to an operation of the CPU 501 that is illustrated in FIG. 17 so as to generate the posting view illustrated in FIG. 14 on the basis of the posted-data management table.

The storage/read unit 79 stores various types of data (or information), such as image data, in the storage unit 7000 or reads various types of data (or information), such as image data, from the storage unit 7000.

Process or Operation According to the Embodiment

Figure 24:
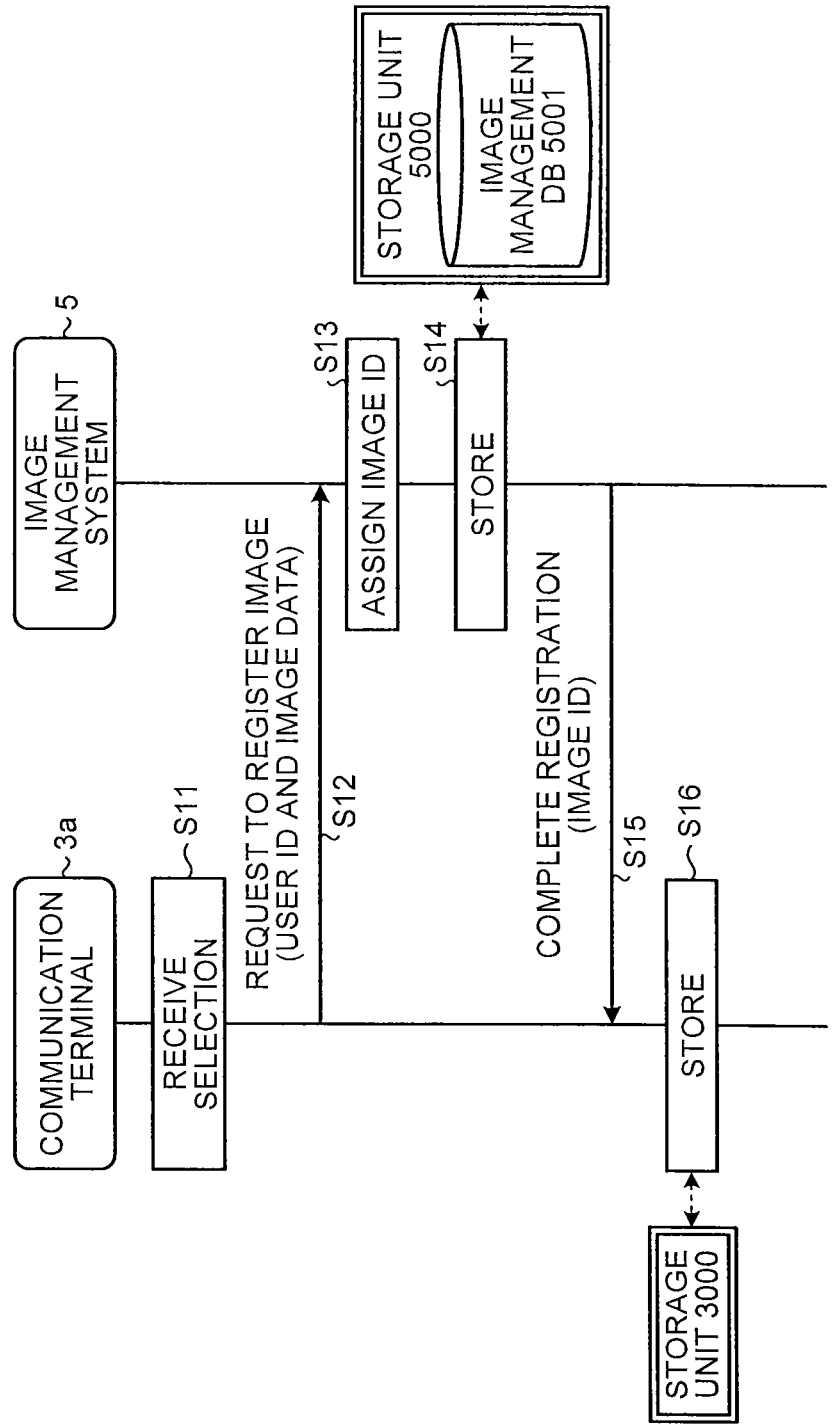
FIG. 24 is a sequence diagram that illustrates a process to upload image data.

Next, an explanation is given, with reference to FIG. 24, of a process performed when the user A uses the communication terminal 3a to upload image data on the captured image illustrated in FIG. 4(c). FIG. 24 is a sequence diagram that illustrates a process to upload the image data.

A communication performed among the communication terminal 3, the image management system 5, and the link-information management system 7 via the communication network 9 is a HyperText Transfer Protocol (HTTP) communication using an HTTP protocol. The communication terminal 3a corresponds to an HTTP client, and the image management system 5 and the link-information management system 7 correspond to HTTP servers.

First, the user A imports the image data on the captured image illustrated in FIG. 4(c) from the capturing device 1 to the storage unit 3000 of the communication terminal 3a. Next, the user A selects the image data that is to be uploaded, and then the operation input receiving unit 32 of the communication terminal 3a receives a selection of the image data to be uploaded (Step S11).

The transmitting and receiving unit 31 of the communication terminal 3a then transmits, to the image management system 5 via the communication network 9, the user ID of the user A and the image data to be uploaded, thereby requesting the image to be registered (Step S12). Thus, the transmitting and receiving unit 51 of the image management system 5 receives the user ID and the image data.

Next, the identification-information assignment unit 52 of the image management system 5 assigns the image ID to the image data received at Step S12 and attaches the image ID to the header section of the image data (Step S13).

The storage/read unit 59 then stores the user ID and the file name of the image data received at Step S12 and the image ID assigned at Step S13 in the image management table (see FIG. 19) in relation to one another for management and also stores the image data in the storage unit 5000 for management (Step S14).

The transmitting and receiving unit 51 then transmits the image ID assigned at Step S13 to the communication terminal 3a via the communication network 9 so as to notify that the registration has been completed (Step S15). Thus, the transmitting and receiving unit 31 of the communication terminal 3a receives the image ID. The storage/read unit 39 of the communication terminal 3a stores the image ID for management (Step S16). In this situation, if the user A or the user B downloads the image data, the display 315 presents the predetermined-area image (the partial image $P_0$) illustrated in FIG. 10(b); therefore, it is difficult for the user A or the user B to instantly recognize which image data has been downloaded. Hence, the user A performs the operation after Step S21, which is described below, whereby the downloaded image data can be easily recognized.

Figure 25:
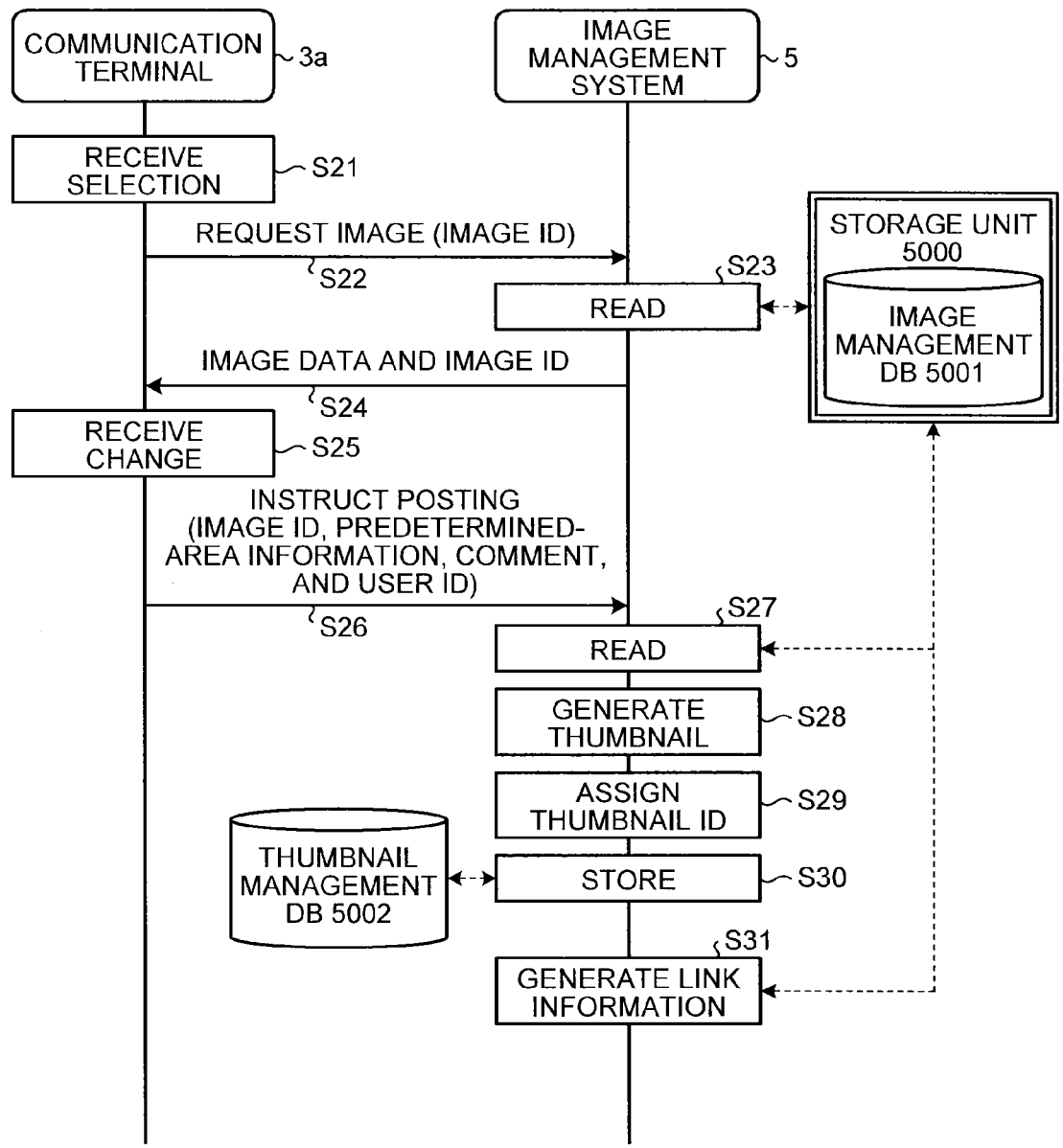
FIG. 25 is a sequence diagram that illustrates a process to generate and upload a thumbnail.

Next, an explanation is given, with reference to FIG. 25, of a process to generate and upload a thumbnail. FIG. 25 is a sequence diagram that illustrates a process to generate and upload a thumbnail.

As illustrated in FIG. 25, the user A uses the communication terminal 3a to select the image data that is to be downloaded, and then the operation input receiving unit 32 of the communication terminal 3a receives a selection of the image data to be downloaded (Step S21). Thus, the storage/read unit 39 reads the image ID of the selected image data from the storage unit 3000.

The transmitting and receiving unit 31 of the communication terminal 3a then transmits, to the image management system 5 via the communication network 9, the image ID of the image data to be requested, thereby requesting the image (Step S22). Thus, the transmitting and receiving unit 51 of the image management system 5 receives the image ID.

Next, the storage/read unit 59 of the image management system 5 searches the image management table (see FIG. 19) by using the image ID received at Step S22 as a search key so as to extract the file name of the corresponding image data and also reads the image data that has the file name from the storage unit 5000 (Step S23).

The transmitting and receiving unit 51 then transmits, to the communication terminal 3a via the communication network 9, the image data read at the above-described Step S23 and the image ID received at the above-described Step S22 (Step S24). Thus, the transmitting and receiving unit 31 of the communication terminal 3a receives the image data and the image ID, whereby the download of the image data is completed. In this situation, the communication terminal 3a still displays the predetermined-area image (the partial image $P_0$) illustrated in FIG. 10(b) by default.

The operation input receiving unit 32 of the communication terminal 3a receives an operation from the user A, and thus the display control unit 33 changes the predetermined-area image (the partial image $P_0$) illustrated in FIG. 10(b) to the predetermined-area image (the partial image $P_1$) illustrated in FIG. 11 (Step S25). At that time, the operation input receiving unit 32 receives an input of the comment (e.g., "the image of the first building") from the user and also receives a request to display the predetermined-area image illustrated in FIG. 11 by default (Step S25).

Next, the transmitting and receiving unit 31 transmits, to the image management system 5 via the communication network 9, the image ID, the predetermined-area information indicating the partial image $P_1$, the comment, and the user ID so as to instruct the image management system 5 to post the link information (Step S26). Thus, the transmitting and receiving unit 51 of the image management system 5 receives the image ID, the predetermined-area information indicating the partial image $P_1$, the comment, and the user ID.

The storage/read unit 59 then searches the image management table (see FIG. 19) by using the image ID received at Step S26 as a search key so as to extract the file name of the corresponding image data and then read the image data from the storage unit 5000 by using the file name (Step S27). The thumbnail generation unit 53 generates thumbnail data from the predetermined area T of the image data as illustrated in FIGS. 9 to 12 by using the image data read at Step S27 and the predetermined area T indicated by the predetermined-area information received at Step S26 (Step S28).

The identification-information assignment unit 52 then assigns thumbnail ID to the thumbnail data generated at Step S28 and attaches the thumbnail ID to the header section of the thumbnail data (Step S29). The storage/read unit 59 then stores, in the thumbnail management table (see FIG. 20), the thumbnail ID assigned at Step S29, the image ID received at Step S26, and the thumbnail data generated at Step S28 in relation to one another for management (Step S30).

The link-information generation unit 54 then links the URL of the image data indicated by the image ID received at Step S26, the image ID received at Step S26, and the predetermined-area information received at Step S26, thereby generating the link information illustrated in FIG. 13 (Step S31).

Figure 26:
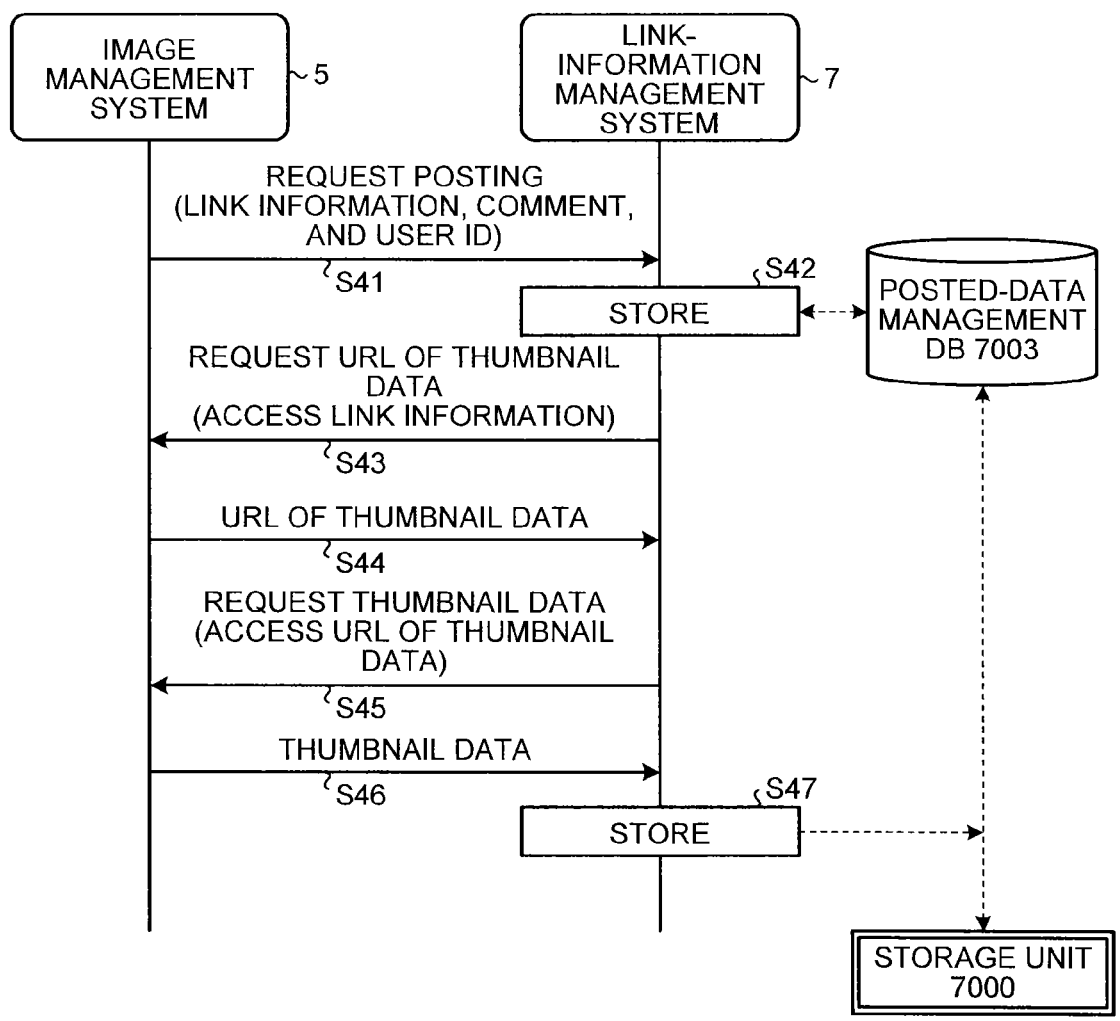
FIG. 26 is a sequence diagram that illustrates a process to upload a thumbnail and link information.

Next, an explanation is given, with reference to FIG. 26, of a process to upload a thumbnail and link information. FIG. 26 is a sequence diagram that illustrates a process to upload a thumbnail and link information.

First, the transmitting and receiving unit 51 of the image management system 5 transmits, to the link-information management system 7 via the communication network 9, the link information that is generated at the above-described Step S31 and the comment and the user ID that are received at the above-described Step S26 so as to request the link-information management system 7 to post the link information (Step S41). Thus, the transmitting and receiving unit 71 of the link-information management system 7 receives the link information, the comment, and the user ID.

The storage/read unit 79 of the link-information management system 7 then stores the user ID, the link information, and the comment, which are received at the above-described Step S41, in relation to one another for management in the posted-data management table (see FIG. 23) (Step S42). In this situation, the link-information management system 7 does not manage thumbnail data. Therefore, the transmitting and receiving unit 71 accesses the image management system 5 that is indicated by the URL included in the link information so as to request the URL of the thumbnail data (Step S43). Thus, the transmitting and receiving unit 51 of the image management system 5 receives the request for the URL of the thumbnail data.

Next, the transmitting and receiving unit 51 of the image management system 5 transmits the URL of the thumbnail data to the link-information management system 7 via the communication network 9 (Step S44). Thus, the transmitting and receiving unit 71 of the link-information management system 7 receives the URL of the thumbnail data.

The transmitting and receiving unit 71 of the link-information management system 7 accesses the image management system 5 that is indicated by the URL of the thumbnail data so as to request thumbnail data (Step S45). Thus, the transmitting and receiving unit 51 of the image management system 5 receives the request for the thumbnail data.

The transmitting and receiving unit 51 of the image management system 5 then transmits the thumbnail data to the link-information management system 7 via the communication network 9 (Step S46). Thus, the transmitting and receiving unit 71 of the link-information management system 7 receives the thumbnail data. The storage/read unit 79 additionally stores the file name of the thumbnail data received at the above-described Step S46 in the empty field section for the file name of the thumbnail data in the posted-data management table (see FIG. 23) and also stores the thumbnail data in the storage unit 7000 for management (Step S47).

Figure 27:
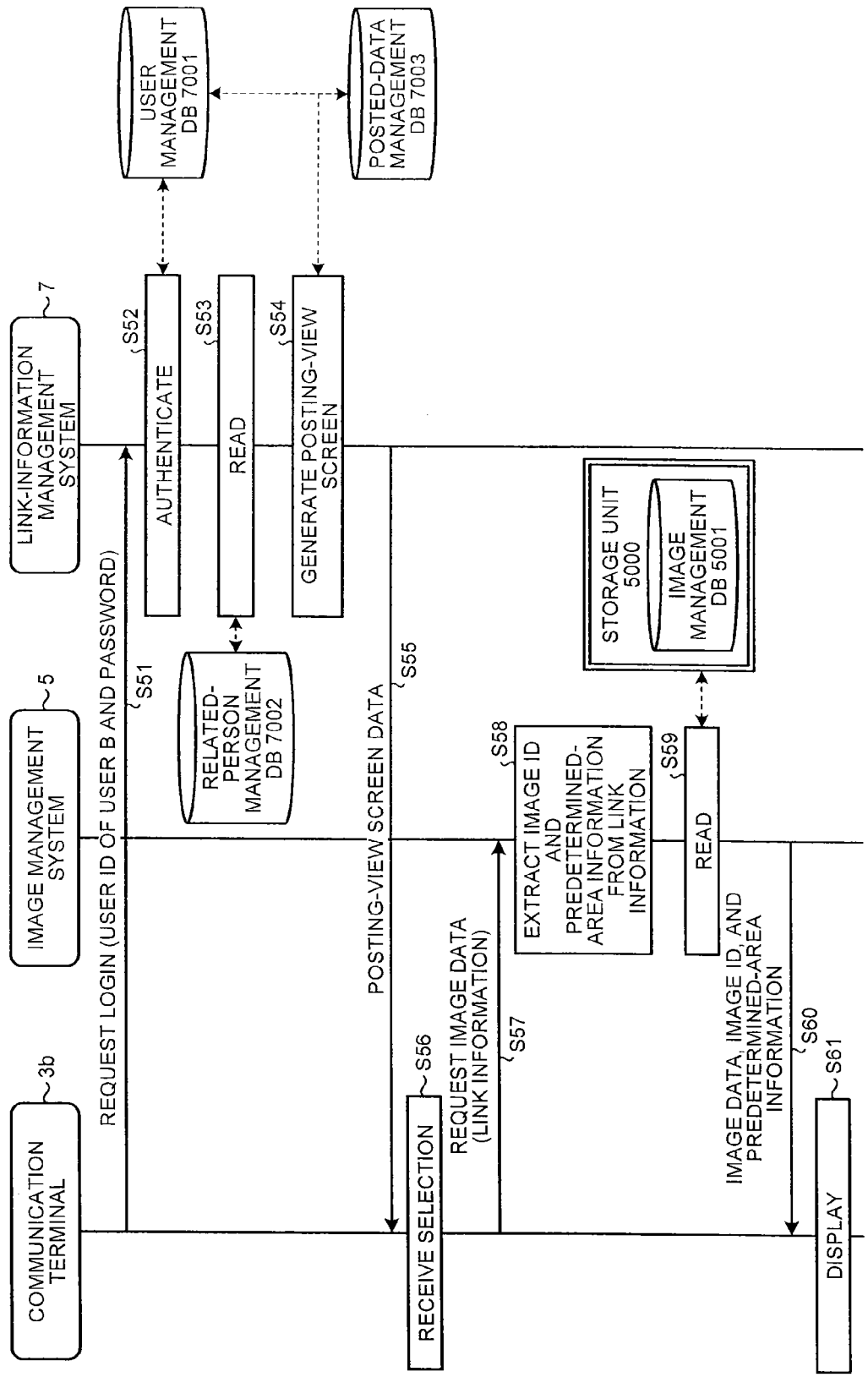
FIG. 27 is a sequence diagram that illustrates a process to download image data.
Figure 28:
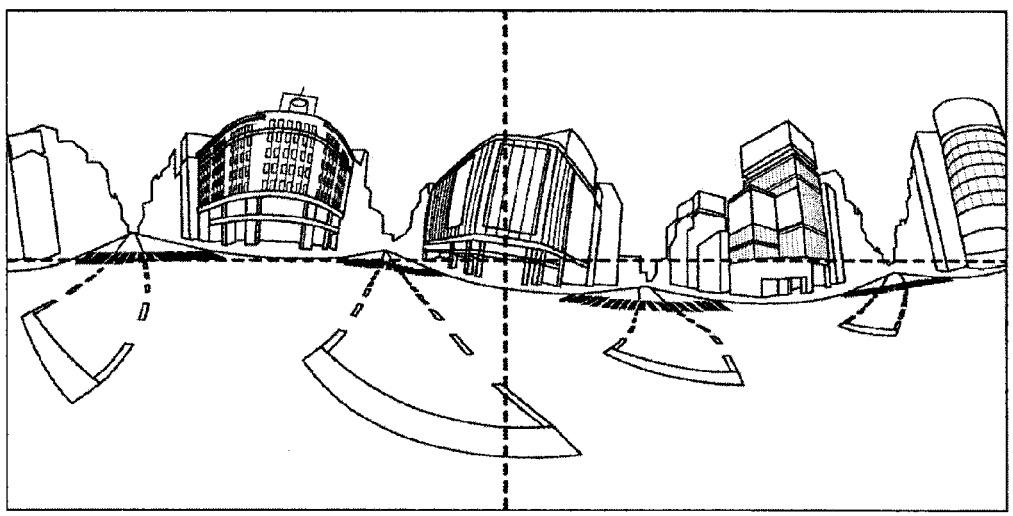
FIG. 28 is a diagram that illustrates a captured image.
Figure 29:
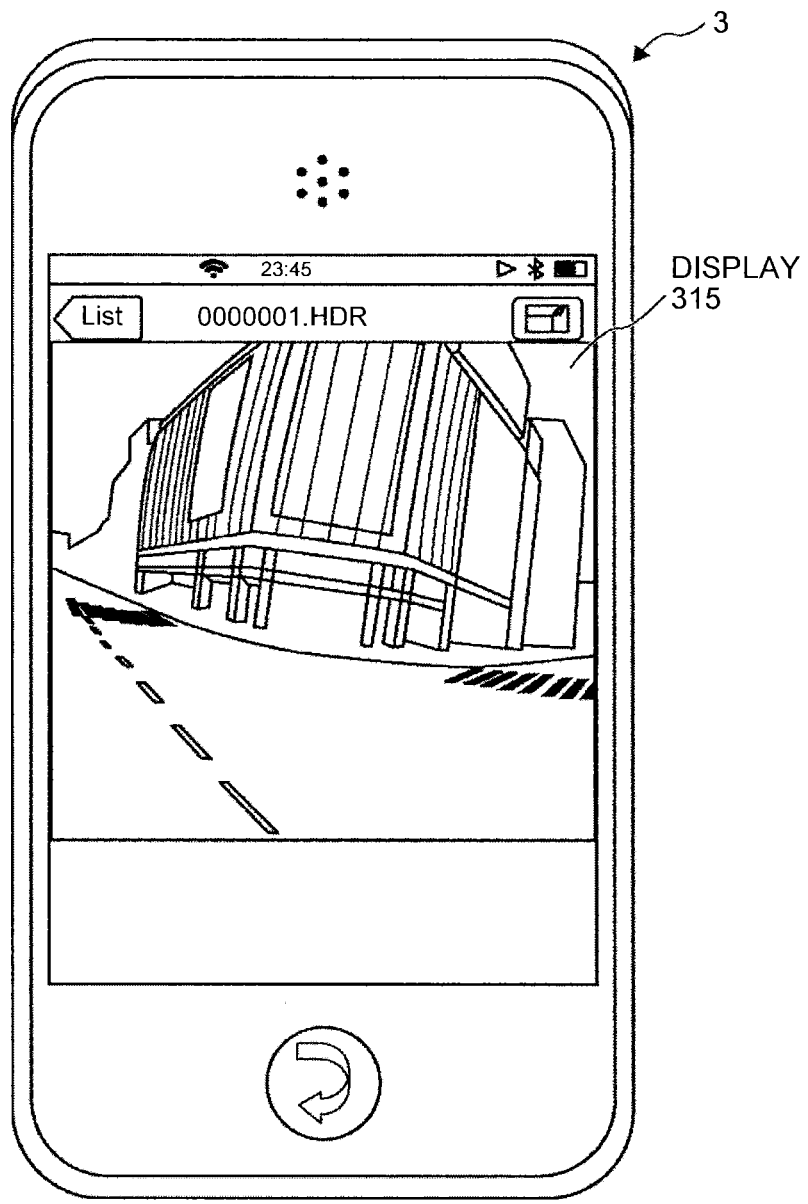
FIG. 29 is a diagram that illustrates a partial image of the captured image that is presented on the display of the communication terminal.

Next, an explanation is given, with reference to FIG. 27, of a process to download image data. FIG. 27 is a sequence diagram that illustrates a process to download image data.

First, the communication terminal 3b transmits the user ID of the user B and the password to the link-information management system 7 via the communication network 9 so as to request login (Step S51). Thus, the link-information management system 7 receives the user ID of the user B and the password.

The storage/read unit 79 of the link-information management system 7 then determines whether the user ID and the password, which are transmitted at the above-described Step S51, are managed in the user management table (see FIG. 21) so as to perform user authentication (Step S52). If it is determined that, as a result of the authentication, the same pair is managed and the user B is an authenticated user, the storage/read unit 79 searches the related-person management table (see FIG. 22) by using the user ID of the user B as a search key so as to read the user ID of the corresponding related person (Step S53).

Next, the posting-view generation unit 72 generates the posting-view screen illustrated in FIG. 14 (Step S54). Here, an explanation is given of a method of generating the posting-view screen. First, the storage/read unit 79 searches the user management table (see FIG. 21) by using the user ID (the user ID of the user A) read at the above-described Step S53 as a search key so as to read the file name of the corresponding user image data and the user personal information. Furthermore, the storage/read unit 79 searches the posted-data management table (see FIG. 23) by using the above-described user ID (the user ID of the user A) as a search key so as to read the corresponding link information, the file name of the thumbnail data, and the comment. Moreover, the file name of the user image data and the user personal information are read. The posting-view generation unit 72 generates the posting-view screen 3200 illustrated in FIG. 14. On the posting-view screen 3200, the user image 3210 is generated by using the image data indicated by the file name of the user image in the user management table (see FIG. 21). Furthermore, the "user A" 3220 is generated by using the user name indicated by the user personal information in the user management table (see FIG. 21). Moreover, the thumbnail 3230 is generated by using the thumbnail indicated by the file name of the thumbnail data in the posted-data management table (see FIG. 23). The "image of the first building" 3240 is generated by using the comment in the posted-data management table (see FIG. 23). The above-described link information is embedded in the thumbnail 3220 and the comment of "the image of the first building" 3240, and hyperlinks are attached thereto.

The transmitting and receiving unit 71 of the link-information management system 7 then transmits, to the communication terminal 3b via the communication network 9, the data on the posting-view screen generated at Step S54 (Step S55). Thus, the transmitting and receiving unit 31 of the communication terminal 3b receives the data on the posting-view screen. The display 315 of the communication terminal 3b then presents the posting-view screen illustrated in FIG. 14. As the display 315 presents the thumbnail of the predetermined-area image (the partial image $P_1$) illustrated in FIG. 11 instead of the thumbnail of the predetermined-area image (the partial image $P_0$) illustrated in FIG. 10(b), the user B is able to easily determine whether the image data is to be downloaded.

Next, the operation input receiving unit 32 of the communication terminal 3b receives, from the user B, a press of the thumbnail 3230 or the comment of "the image of the first building" 3240 on the posting-view screen 3200, thereby receiving a selection of the link information (Step S56).

The transmitting and receiving unit 31 then transmits, to the image management system 5 via the communication network 9, the link information (see FIG. 13) selected at the above-described Step S56 so as to request the image data (Step S57). Thus, the transmitting and receiving unit 51 of the image management system 5 receives the link information.

The extraction unit 55 then extracts the image ID and the predetermined-area information from the link information received at the above-described Step S57 (Step S58). The storage/read unit 59 searches the image management table (see FIG. 19) by using the image ID extracted at Step S58 as a search key so as to extract the file name of the corresponding image data and also reads the image data that has the file name from the storage unit 5000 (Step S59).

The transmitting and receiving unit 51 then transmits, to the communication terminal 3b via the communication network 9, the image data read at Step S59 and the image ID and the predetermined-area information extracted from the link information at Step S58 (Step S60). Thus, the transmitting and receiving unit 31 of the communication terminal 3b receives the image data, the image ID, and the predetermined-area information.

As illustrated in FIG. 11, the display control unit 33 of the communication terminal 3b then generates and displays the predetermined-area image (the partial image $P_1$) from the predetermined area T of the image data by using the image data and the predetermined-area information received at Step S60 (Step S61).

Principal Advantage of the Present Embodiment

As described above, in the present embodiment, the image management system 5 transmits, to the communication terminal 3b, not only the image data but also the predetermined-area information that indicates the predetermined area T in the image data. Thus, it is possible to change the predetermined-area image that is set by default to be a local image around the center of the composition obtained when captured by a digital camera, or the like. Thus, an advantage is produced such that the user A is able to initially show to the user B the local image to which the user A pays attention or which is a recommended sight.

Additional Notes of the Embodiment

In the above-described embodiment, as illustrated in FIG. 13, the link information includes the URL that indicates the location of the image management system 5 in the communication network 9; however, this is not a limitation. For example, the link information may not include the URL and may be indicated by using the image ID and the predetermined-area information only. In this case, a user operates the communication terminal 3 to input the URL.

The image management system 5 and the link-information management system 7 according to the above-described embodiment may be configured by using a single computer or may be configured by using a plurality of computers to which each unit (function, means, or storage unit) is separated and assigned arbitrarily.

Furthermore, a recording medium, such as a CD-ROM, that stores each program according to the above-described embodiment or the HD 504 that stores the program may be provided as a program product in the country and overseas.

As described above, according to the present invention, the image management system transmits, to the first communication terminal, not only the image data but also the predetermined-area information that indicates the predetermined area in the image data. Thus, it is possible to change the predetermined-area image that is set, by default, to be a local image around the center of the composition that is obtained when captured by a digital camera, or the like. Thus, an advantage is produced such that the user who uploads the image is able to initially show to another user the local image to which the user pays attention or which is a recommended sight.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image management system that communicates with a first communication terminal and a second communication terminal via a communication network, the image management system comprising:
   a communication interface configured to receive, from the second communication terminal, image data and predetermined-area information that indicates a predetermined area in the image data based on an angle of view which originates at the center of a virtual sphere, the image data being a fully spherical panoramic image corresponding to a Mercator image being attached to an inner surface of a virtual sphere and the predetermined area in the image data being selected by a user of the second communication terminal and being a portion of the fully spherical panoramic image;
   a memory configured to store the image data and predetermined area information received from the second communication terminal; and
   processing circuitry configured to generate link information that includes image identification information for identifying the image data and identification information of the predetermined-area information, wherein the link information is thereafter provided to the first communication terminal;
   wherein the communication interface configured to receive, from the first communication terminal, the link information; and
   the communication interface is configured to transmit, to the first communication terminal, the image data that is indicated by the image identification information included in the received link information and the predetermined-area information included in the link information, wherein the predetermined-area information causes the first communication terminal to display the predetermined area selected by the user of the second communication terminal as a zoomed in portion of the overall image data from which the user of the first communication terminal performs input operations to view other portions of the image data surrounding the predetermined area.

2. The image management system according to claim 1, wherein the communication interface transmits the link information generated by the processing circuitry to the first communication terminal.

3. The image management system according to claim 2, the processing circuitry being configured to generate thumbnail data from the predetermined area in the image data by using the image data indicated by the image identification information received by the communication interface and the predetermined area indicated by the predetermined-area information, wherein
the communication interface transmits, to the first communication terminal, the thumbnail data generated by the processing circuitry.

4. The image management system according to claim 2, wherein
the processing circuitry generates the link information that includes specific information for identifying a location of the image management system in the communication network as well as the image identification information and the predetermined-area information.

5. The image management system according to claim 2, wherein
the communication interface receives, from the second communication terminal, comment data with regard to the image data as well as the image identification information and the predetermined-area information, and
the communication interface transmits, to the first communication terminal, the comment data as well as the link information.

6. The image management system according to claim 2, wherein
the communication interface receives, from the second communication terminal, user identification information for identifying a user who uses the second communication terminal as well as the image identification information and the predetermined-area information, and
the communication interface transmits, to the first communication terminal, the user identification information as well as the link information.

7. The image management system according to claim 1, wherein the processing circuitry is configured to read the image data from the memory on the basis of the image identification information included in the link information received by the communication interface, wherein
the communication interface transmits, to the first communication terminal, the image data read by the processing circuitry as the image data that is indicated by the image identification information included in the link information.

8. An image management method performed by an image management system that communicates with a first communication terminal and a second communication terminal via a communication network, the image management method comprising:
receiving from the second communication terminal, image data and predetermined-area information that indicates a predetermined area in the image data based on an angle of view which originates at the center of a virtual sphere, the image data being a fully spherical panoramic image corresponding to a Mercator image being attached to an inner surface of a virtual sphere and the predetermined area in the image data being selected by a user of the second communication terminal and being a portion of the fully spherical panoramic image;
storing, in a memory, the image data and predetermined area information received from the second communication terminal;
generating link information that includes image identification information for identifying the image data and identification information of the predetermined-area information, wherein the link information is thereafter provided to the first communication terminal;
receiving the link information from the first communication terminal; and
transmitting, to the first communication terminal, the image data that is indicated by the image identification information included in the received link information and the predetermined-area information included in the link information,
wherein the predetermined-area information causes the first communication terminal to display the predetermined area selected by the user of the second communication terminal as a zoomed in portion of the overall image data from which the user of the first communication terminal performs input operations to view other portions of the image data surrounding the predetermined area.

9. A non-transitory computer-readable medium that contains a computer program that, when executed by an image management system that communicates with a first communication terminal and a second communication terminal via a communication network, causes the image management system to perform operations comprising:
receiving from the second communication terminal, image data and predetermined-area information that indicates a predetermined area in the image data based on an angle of view which originates at the center of a virtual sphere, the image data being a fully spherical panoramic image corresponding to a Mercator image being attached to an inner surface of a virtual sphere and the predetermined area in the image data being selected by a user of the second communication terminal and being a portion of the fully spherical panoramic image;
storing, in a memory, the image data and predetermined area information received from the second communication terminal;
generating link information that includes image identification information for identifying the image data and identification information of the predetermined-area information, wherein the link information is thereafter provided to the first communication terminal;
receiving the link information from the first communication terminal; and
transmitting, to the first communication terminal, the image data that is indicated by the image identification information included in the received link information and the predetermined-area information included in the link information,
wherein the predetermined-area information causes the first communication terminal to display the predetermined area selected by the user of the second communication terminal as a zoomed in portion of the overall image data from which the user of the first communication terminal performs input operations to view other portions of the image data surrounding the predetermined area.

* * * * *